(12) United States Patent
Littleford et al.

(10) Patent No.: US 9,694,317 B2
(45) Date of Patent: Jul. 4, 2017

(54) MULTI-POLLUTANT ABATEMENT DEVICE AND METHOD

(71) Applicant: ALTIRA TECHNOLOGY FUND V L.P., Denver, CO (US)

(72) Inventors: Wayne S. Littleford, Griffith (CA); Sanjeev Jolly, Louisville, KY (US); Dan Nolan, Fredericksburg, IN (US); Andrew Verdouw, Georgetown, IN (US)

(73) Assignee: Altira Technology Fund V L.P., Denver, CO (US)

( * ) Notice: Subject to any disclaimer, the term of this patent is extended or adjusted under 35 U.S.C. 154(b) by 306 days.

(21) Appl. No.: 13/827,473

(22) Filed: Mar. 14, 2013

(65) Prior Publication Data

US 2013/0296615 A1 Nov. 7, 2013

Related U.S. Application Data

(60) Provisional application No. 61/684,602, filed on Aug. 17, 2012, provisional application No. 61/642,170, filed on May 3, 2012.

(51) Int. Cl.
  *B01D 53/02* (2006.01)
  *B01D 53/62* (2006.01)
  (Continued)

(52) U.S. Cl.
  CPC ........... *B01D 53/62* (2013.01); *B01D 53/507* (2013.01); *B01D 53/56* (2013.01); *B01D 53/75* (2013.01);
  (Continued)

(58) Field of Classification Search
  CPC ........ B01D 2251/104; B01D 2252/103; B01D 2252/20421; B01D 2253/102; B01D 2257/302; B01D 2257/404; B01D 2257/504; B01D 2257/602; B01D 2257/702; B01D 2258/0283; B01D 53/507; B01D 53/56; B01D 53/62; B01D 53/75; B01D 53/76; B01D 53/78; Y02C 10/04
  See application file for complete search history.

(56) References Cited

U.S. PATENT DOCUMENTS 2,390,316 A 12/1945 Mottern
3,095,458 A 6/1963 Judice et al.
(Continued)

FOREIGN PATENT DOCUMENTS

CN 101708415 A 5/2010
EP 2100869 A1 9/2009
(Continued)

OTHER PUBLICATIONS

International Search Report for International Application No. PCT/US2012/020134; dated Aug. 29, 2012 (3 pages).
(Continued)

*Primary Examiner* — Christopher P Jones
(74) *Attorney, Agent, or Firm* — Polsinelli PC

(57) ABSTRACT

A method for removing contaminants from industrial exhaust gas. The method includes contacting the exhaust gas with a mist of water and $RNH_2$ (amine) to form a liquid solution of $CO_2$. The method further includes extracting the liquid solution of $CO_2$ and contacting the exhaust gas with granular activated carbon.

15 Claims, 15 Drawing Sheets

(51) Int. Cl.
*B01D 53/50* (2006.01)
*B01D 53/56* (2006.01)
*B01D 53/75* (2006.01)
*B01D 53/76* (2006.01)
*B01D 53/78* (2006.01)

(52) U.S. Cl.
CPC .............. *B01D 53/76* (2013.01); *B01D 53/78* (2013.01); *B01D 2251/104* (2013.01); *B01D 2252/103* (2013.01); *B01D 2252/20421* (2013.01); *B01D 2253/102* (2013.01); *B01D 2257/302* (2013.01); *B01D 2257/404* (2013.01); *B01D 2257/504* (2013.01); *B01D 2257/602* (2013.01); *B01D 2257/702* (2013.01); *B01D 2258/0283* (2013.01); *Y02C 10/04* (2013.01)

(56) References Cited

U.S. PATENT DOCUMENTS

| | | | |
|---|---|---|---|
| 3,106,592 | A | 10/1963 | Toren |
| 3,473,298 | A | 10/1969 | Berman |
| 3,542,510 | A | 11/1970 | Newman et al. |
| 3,618,301 | A | 11/1971 | Handman |
| 3,649,188 | A | 3/1972 | Keilin et al. |
| 3,851,047 | A | 11/1974 | Bailey |
| 3,997,415 | A | 12/1976 | Machi et al. |
| 4,011,272 | A | 3/1977 | Matsuzawa et al. |
| 4,102,982 | A | 7/1978 | Weir, Jr. |
| 4,158,702 | A | 6/1979 | Archer |
| 4,189,309 | A | 2/1980 | Hoekstra |
| 4,213,945 | A | 7/1980 | Haese et al. |
| 4,471,142 | A | 9/1984 | Burton et al. |
| 4,590,047 | A | 5/1986 | Donnelly et al. |
| 4,693,213 | A | 9/1987 | Yanai et al. |
| 4,761,505 | A | 8/1988 | Diana et al. |
| 4,849,192 | A | 7/1989 | Lyon |
| 5,061,348 | A | 10/1991 | McCormick et al. |
| 5,122,352 | A | 6/1992 | Johnson |
| 5,206,002 | A | 4/1993 | Skelley et al. |
| 5,232,676 | A | 8/1993 | Wolff et al. |
| 5,270,025 | A | 12/1993 | Ho et al. |
| 5,316,737 | A | 5/1994 | Skelley et al. |
| 5,321,946 | A | 6/1994 | Abdelmalek |
| 5,366,708 | A | 11/1994 | Matros et al. |
| 5,503,821 | A | 4/1996 | McAlister et al. |
| 5,571,483 | A | 11/1996 | Pfingstl et al. |
| 5,593,469 | A | 1/1997 | Crawford |
| 5,603,811 | A | 2/1997 | Lucas et al. |
| 5,670,122 | A | 9/1997 | Zamansky et al. |
| 6,056,928 | A | 5/2000 | Fetzer et al. |
| 6,162,409 | A | 12/2000 | Skelley et al. |
| 6,240,725 | B1 | 6/2001 | Scappatura |
| 6,344,177 | B1 | 2/2002 | Littleford |
| 6,508,915 | B1 | 1/2003 | Osuda et al. |
| 6,969,446 | B1 | 11/2005 | Dichtl et al. |
| 7,563,307 | B2 | 7/2009 | Gaskin |
| 8,084,652 | B2 | 12/2011 | Littleford |
| 2006/0204407 | A1 | 9/2006 | McWhorter |
| 2007/0203372 | A1 | 8/2007 | Ramakers |
| 2007/0286794 | A1 | 12/2007 | Hommeltoft et al. |
| 2009/0229595 | A1 | 9/2009 | Schwartz, Jr. |
| 2010/0000405 | A1 | 1/2010 | Greiner |
| 2010/0016453 | A1 | 1/2010 | Bolton et al. |
| 2011/0067411 | A1 | 3/2011 | Littleford |

FOREIGN PATENT DOCUMENTS

| | | | |
|---|---|---|---|
| GB | 446614 | A | 5/1936 |
| GB | 471667 | A | 9/1937 |
| GB | 650302 | A | 2/1951 |
| GB | 2461723 | A | 1/2010 |
| JP | 04161702 | A | 6/1992 |
| JP | 4190831 | A | 7/1992 |
| JP | 06094202 | A | 4/1994 |
| KR | 20050017649 | A | 2/2005 |
| WO | 9318800 | A1 | 9/1993 |
| WO | 9530113 | A1 | 11/1995 |
| WO | 9611884 | A1 | 4/1996 |
| WO | 0155642 | A1 | 8/2001 |
| WO | 2008015487 | A1 | 2/2008 |
| WO | 2008041921 | A1 | 4/2008 |
| WO | 2009025003 | A2 | 2/2009 |
| WO | 2009048685 | A1 | 4/2009 |
| WO | 2009120384 | A2 | 10/2009 |
| WO | 2010037109 | A2 | 4/2010 |
| WO | 2012094362 | A2 | 7/2012 |

OTHER PUBLICATIONS

Hammann, Mark. "Direct Contact Process Water Heating", ComEd, Oakbrook Terrace, Illionis, Preceeding of the Twenty-Eighth Industrial Energy Transfer Conference, New Orleans, LA May 9-12, 2006.

Jiang, Z., T. Xiao, V. L. Kuznetsov, and P. P. Edwards. "Turning Carbon Dioxide into Fuel." Philosophical Transactions of the Royal Society A: Mathematical, Physical and Engineering Sciences 368. 1923 (2010): 3343-364.

Kalogo, Youssouf, Shiva Habibi, Heather L. MacLean, and Satish V. Joshi. "Environmental Implications of Municipal Solid Waste-Derived Ethanol." Environmental Science & Technology 41.1 (2007): 35-41.

Kuehner, Edwin C., Robert. Alvarez, Paul J. Paulsen, and Thomas J. Murphy. "Production and Analysis of Special High-purity Acids Purified by Subboiling Distillation." Analytical Chemistry 44.12 (1972): 2050-056.

Miliauskas, Gintautas, Stasys Sinkunas, and Giedrius Miliauskas. "Evaporation and Condensing Augmentation of Water Droplets in Flue Gas." International Journal of Heat and Mass Transfer 53.5-6 (2010): 1220-230.

Pandey, R. A., R. Biswas, T. Chakrabarti, and S. Devotta. "Flue Gas Desulfurization: Physicochemical and Biotechnological Approaches." Critical Reviews in Environmental Science and Technology 35.6 (2005): 571-622.

Mirjafari, Parissa, Koorosh Asghari, and Nader Mahinpey. "Investigating the Application of Enzyme Carbonic Anhydrase for COSequestration Purposes." Industrial & Engineering Chemistry Research 46.3 (2007): 921-26.

Thitakamol, B., A. Veawab, and A. Aroonwilas. "Environmental Impacts of Absorption-based CO2 Capture Unit for Post-combustion Treatment of Flue Gas from Coal-fired Power Plant." International Journal of Greenhouse Gas Control 1.3 (2007): 318-42.

Prior Art Search Report prepared in connection with U.S. Appl. No. 12/882,693; Dated Jul. 7, 2010 (28 pages).

International Search Report and Written Opinion mailed Jun. 21, 2013 in International application No. PCT/US2013/031666 (12 pages).

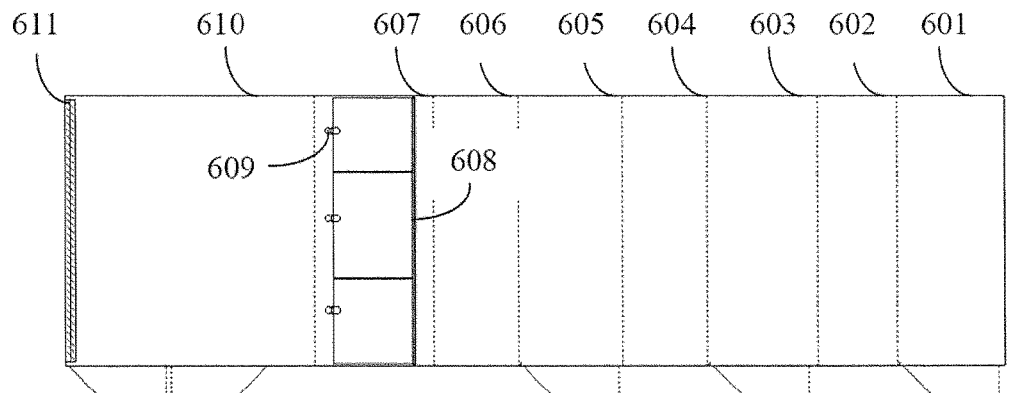
FIG. 6A
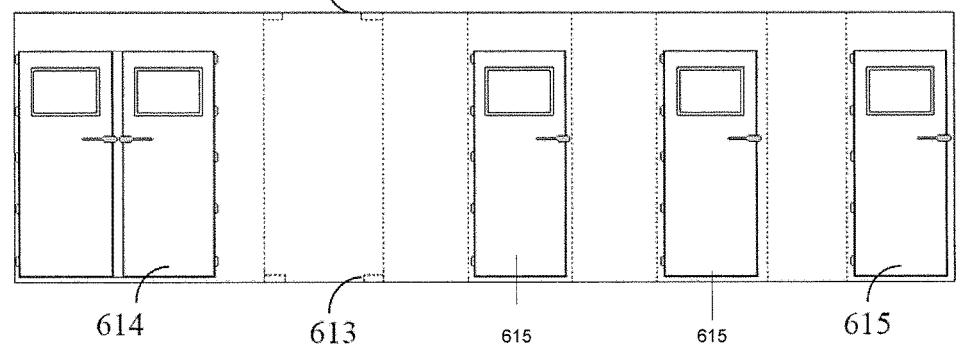
FIG. 6B
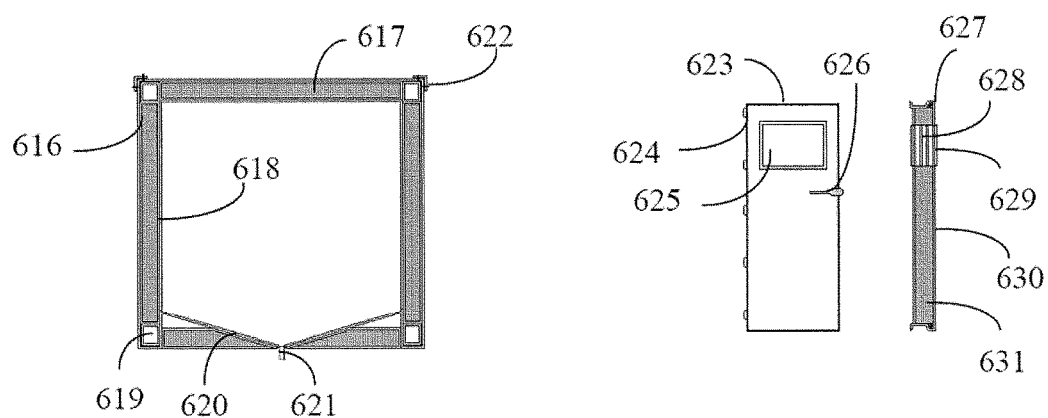
FIG. 6C
FIG. 6D

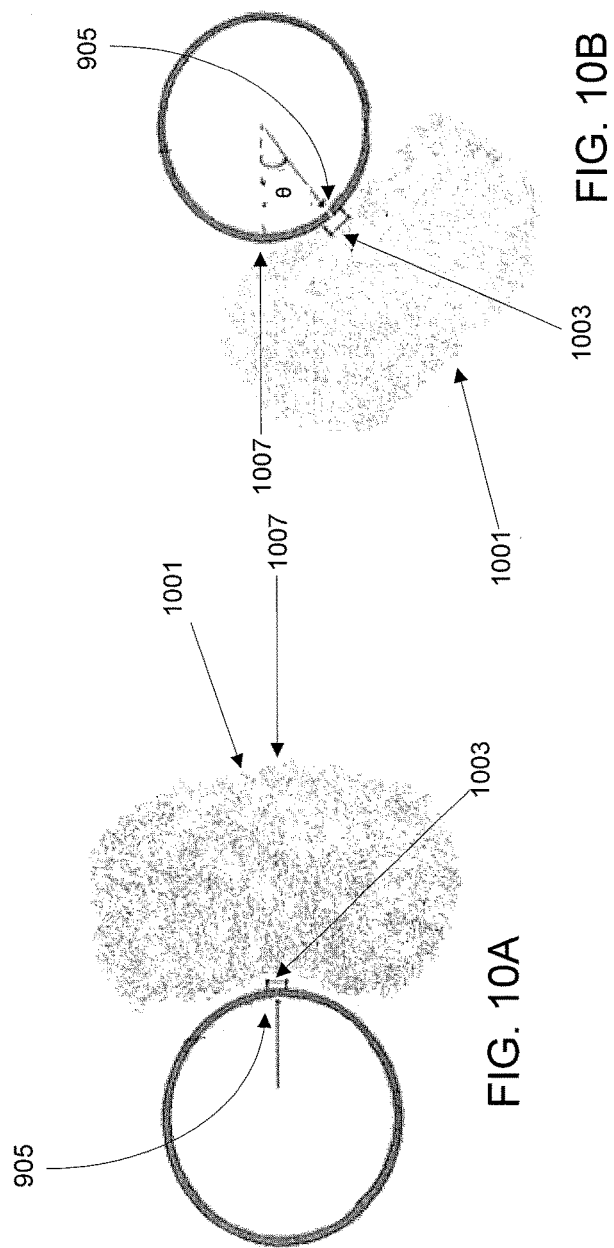
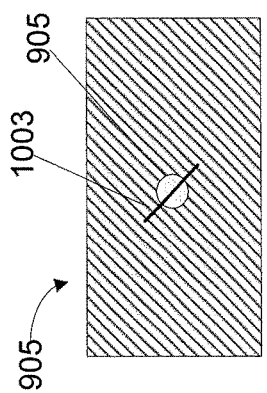
FIG. 10A
FIG. 10B
FIG. 10C

| EASTERN BITUMINOUS ULTIMATE ANALYSIS | | | |
|---|---|---|---|
| Carbon | 69.9% | Hydrogen | 4.7% |
| Oxygen | 6.4% | Nitrogen | 1.2% |
| Sulfur | 2.2% | Ash | 13.2% |
| Moisture | 2.4% | Heating Value | 12,644 Btu/lb |

FIG. 13A

| Operating Conditions (8/14/2012) | | |
|---|---|---|
| | Inlet | Outlet |
| Gas Temp | 257°F (125°C) | 89°F (32°C) |
| NOx | 43.36 ppm | 0.44 ppm |
| $SO_2$ | 216.58 ppm | 0.00 ppm |
| $CO_2$ | 13,865 ppm | 3,352 ppm |

FIG. 13B

MULTI-POLLUTANT ABATEMENT DEVICE AND METHOD

CROSS-REFERENCE TO RELATED APPLICATIONS

This application claims priority pursuant to 35 U.S.C. §119(e) to U.S. Provisional Patent Application No. 61/684,602, filed Aug. 17, 2012, and to U.S. Provisional Patent Application No. 61/642,170, filed May 3, 2012. The disclosures of both U.S. Provisional Patent Applications No. 61/684,602 and U.S. Provisional Patent Applications No. 61/642,170 are incorporated by reference herein in their entirety.

BACKGROUND

The combustion byproducts of hydrocarbon fuels primarily include nitrogen ($N_2$), carbon dioxide ($CO_2$), water ($H_2O$), carbon monoxide (CO), unburned hydrocarbons (UHC), oxides of sulfur ($SO_x$), particulate (soot), oxides of nitrogen ($NO_x$), elemental mercury (Hg), oxides of mercury (Hg(II)) and hydrogen chloride (HCl). The items, CO, $CO_2$, Hg, $Hg_2$, HCl, UHC, $SO_x$, particulate and $NO_x$ are unwanted and undesirable. These pollutants are referred to as criteria pollutants and many regulatory agencies around the world have established guidelines for their control. CO is a gas that is an intermediate product of combustion of hydrocarbon fuels. UHC often results from poor fuel atomization or quenching of the combustion process by the combustion cooling air film or by high levels of water or steam injection. Oxides of sulfur are formed when sulfur is present in the fuel during combustion. $SO_x$ forms over a wide range of combustion temperatures and cannot be controlled in the combustion process itself. Hence, $SO_x$ formation either must be prevented from occurring by limiting sulfur in the fuel or else the $SO_x$ that is created must be removed from the exhaust stream by wet scrubbing or sorbent injection. Particulate matter (i.e., soot or smoke) results from the combustion of liquid fuels/air ratios in the combustion primary zone. $NO_x$, by virtually unanimous agreement, is considered a primary contributor to visible pollution and deteriorating air quality. The reduction of $NO_x$ has become the major focus of air quality regulations throughout the world in efforts to improve air quality.

Reducing $NO_x$ along with other unwanted pollutants from fossil fuel-fired turbine exhaust gas is an important process for atmospheric and environmental protection on a global scale. Natural-fired, oil-fired, diesel-fired and biofuel-fired turbines produce tons of $NO_x$ per year, along with other unwanted pollutants such as $SO_x$, HCl, mercury and particulate.

Concerns over the future effects of global climate change are increasingly leading to the desire to control and reduce carbon dioxide ($CO_2$) emission into the atmosphere. $CO_2$ originates from a variety of sources, many of which involve the combustion of an organic fuel such as coal, natural gas, gasoline, fuel oil, and methane. Specifically, combustion processes that are used for the generation of electricity and/or heat are a significant source of $CO_2$.

Capturing and reusing waste energy is another important factor in the operation of the fossil fuel fired turbine plant. To this end, many plants employ heat recovery steam generators (HRSG) that capture most of the waste heat and produces steam to increase the operational output of the plant. However, there is still approximately 10% of the waste heat that escapes to atmosphere that can be captured and reused in the plant to increase the efficiencies of the operations of the fossil-fired fuel turbine plant.

SUMMARY

In general in one aspect, one or more embodiments of the invention are directed to a method for removing contaminants from industrial exhaust gas. The method includes contacting the exhaust gas with a mist of water and $RNH_2$ (amine) to form a liquid solution of $CO_2$. The method further includes extracting the liquid solution of $CO_2$ and contacting the exhaust gas with granular activated carbon.

In general in one aspect, one or more embodiments of the invention are directed to a system for removing contaminants from an industrial stream of exhaust gas. The system includes a first misting stage configured to receive the stream of exhaust gas and contact the stream of exhaust gas with mist of water and $H_2O_2$ to create a liquid comprising liquid acids, the liquid acids comprising nitric acid ($HNO_3$) and carbonic acid ($H_2CO_3$). The system further includes a first condensing medium configured to condense the liquid acids from the stream of exhaust gas including $HNO_3$ and $H_2CO_3$ and to collect on the surface of the condensing medium a first residual liquid mixture of $HNO_3$ and $H_2CO_3$. A second misting stage is configured to receive the stream of exhaust gas and contact the stream of exhaust gas with water mist to create a liquid comprising liquid acids, the liquid acids including nitric acid ($HNO_3$) and carbonic acid ($H_2CO_3$). A second condensing medium is configured to condense the liquid acids from the stream of exhaust gas comprising $HNO_3$ and $H_2CO_3$ and to collect on the surface of the condensing medium a second residual liquid mixture of $HNO_3$ and $H_2CO_3$. A third misting stage is configured to receive the stream of exhaust gas and contact the stream of exhaust gas with a mixture of chilled water and $RNH_2$ (amine) to form a liquid solution of $CO_2$. A third condensing medium is configured to condense the liquid solution of $CO_2$ and to collect on the surface of the condensing medium a third residual liquid mixture of $HNO_3$, $H_2CO_3$, and $CO_2$. Furthermore an activated carbon stage configured to receive the stream of exhaust gas and to contact the stream of exhaust gas with granular activated carbon to further remove trace contaminants from the exhaust gas stream.

Other aspects of the invention will be apparent from the following description and the appended claims.

BRIEF DESCRIPTION OF DRAWINGS

FIGS. 6A-6D show various views of a modular system for multi-pollutant abatement in accordance with one or more embodiments of the invention.

FIG. 10A-10C show cross-sectional views through a high-pressure fogging rod in accordance with one or more embodiments of the invention.

FIGS. 13A-13D show a plot of pollution removal rates of a multi-pollution abatement device in accordance with one or more embodiments of the invention.

DETAILED DESCRIPTION

Figure 1:
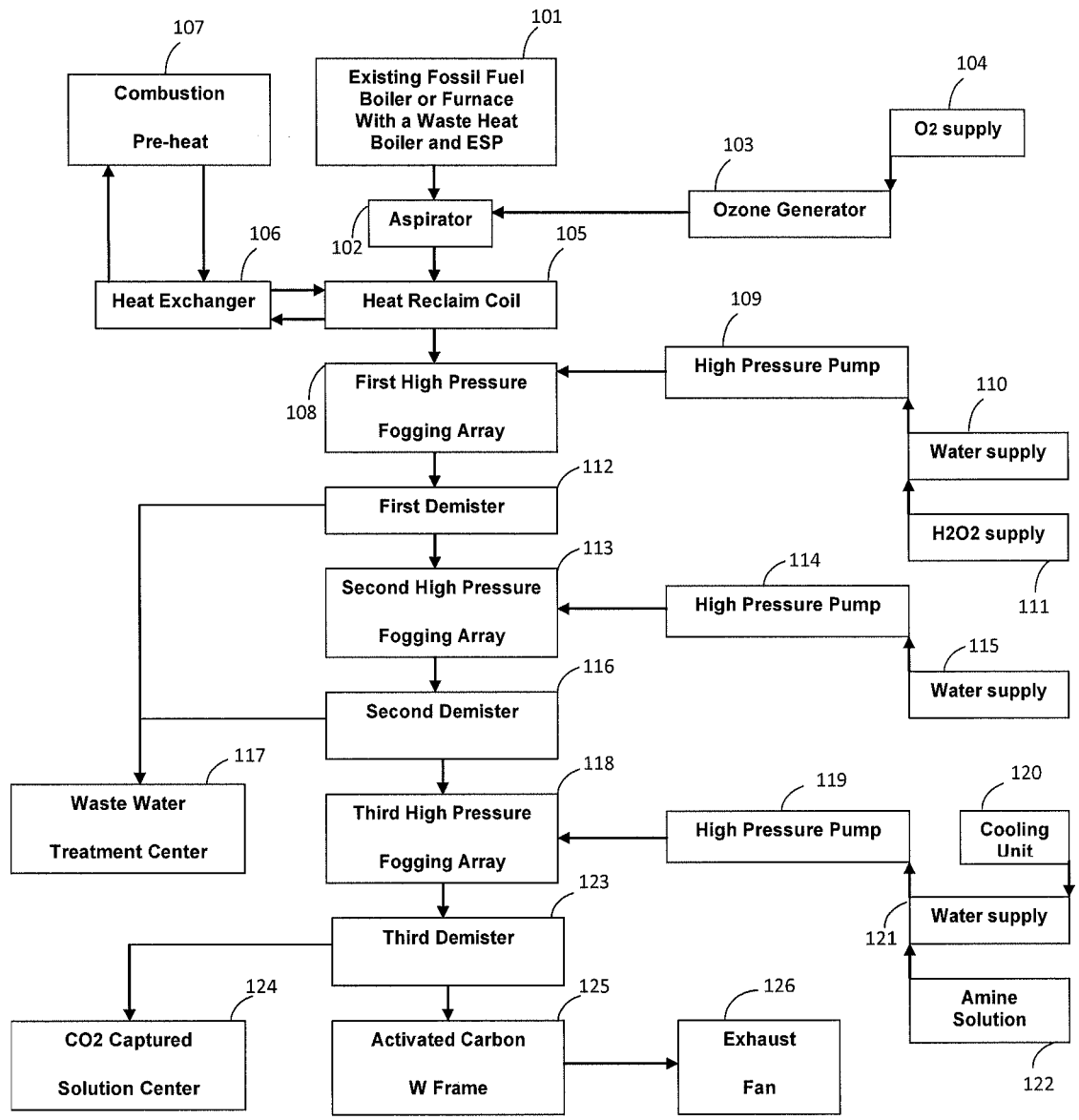
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a device and method for multi-pollution abatement. More specifically, one or more embodiments of the invention provide for creating carbonic acid ($H_2CO_3$) from an exhaust gas stream that includes $CO_2$ and combining the $H_2CO_3$ with a reagent to create alcohol. The invention may further provide for creating other acids from the exhaust gas stream, including but not limited to sulfuric acid ($H_2SO_4$) and nitric acid ($HNO_3$) and combining those other acids with one or more reagents to create one or more alcohols. All the piping and associated fittings, pumps, valves, and other equipment are made of materials resistant to the chemicals transported, transformed, pressurized, created, or otherwise handled within those fittings, pumps, valves, and other equipment. As used herein, the term "acid" or "acids" may refer to at least carbonic acid, sulfuric acid, and/or nitric acid. As used herein, "amine" refers to the ammonia derivative class of molecules given by the formula $RNH_2$. Examples of amines that may be used in accordance with one or more embodiments of the present invention include monoethanolamine (MEA), diethanolamine (DEA), methyl-diethanolamine, and diisopropylamine (DIPA). MEA is an organic chemical compound with the formula $RNH_2$ that is both a primary amine and primary alcohol. Like other amines, monoethanolamine acts as a weak base. DEA is an organic compound with the formula $HN(CH_2CH_2OH_2)$ which is polyfunctional, being secondary amine and diol. MDEA is a clear, colorless or pale yellow liquid with an ammonia odor. It has a formula $CH_3N(C_2H_4OH)_2$. MDEA is a tertiary amine and is widely used as a solvent for exhaust gas treatment. DIPA is a secondary amine with a chemical formula $(CH_3)_2HC—NH—CH(CH_3)_2$ which is best known as its lithium salt, lithium diisopropylamine.

As used herein, the term "granular carbon" or "granulated activated carbon" is used to refer to activated carbon particulate of a size that is greater than that of "powdered carbon," which is known to have an average diameter between 0.15 mm and 0.25 mm. Thus, as used herein, granular activated carbon has a larger average particle diameter compared to powdered activated carbon and consequently, granular carbon presents a smaller external surface area than powdered carbon. The size of granulated activated carbon is designated by standard mesh sizes, e.g., U.S. standard mesh sizes such as 4, 6, 8, 12, 20, 30, 40, 50, which correspond to openings having a size of 4.76 mm, 3.36 mm, 2.38 mm, 1.68 mm, 0.84 mm, 0.59 mm, 0.42 mm, and 0.030 mm, respectively. Thus, a 20×40 granulated carbon is made of particles that will pass through a U.S. Standard Mesh Size No. 20 sieve (0.84 mm) (generally specified as 85% passing) but be retained on a U.S. Standard Mesh Size No. 40 sieve (0.42 mm) (generally specified as 95% retained). In other words, a 20×40 granulated carbon is a carbon particulate having a granules of varying size, wherein 95% of the granules have a diameter greater than 0.42 mm and 85% of the granules have a diameter less than 0.84 mm.

In accordance with one or more embodiments of the present invention, a multi-pollution abatement device includes a condensing medium such as a demister or chlorinated polyvinyl chloride (CPVC) packing. In order to reduce exhaust gas temperatures before the exhaust gas enters the multi-pollution abatement device, in one embodiment, an economizer is disposed before the multi-pollution abatement device. Furthermore, in accordance with one or more embodiments, a third stage fogging array or misting apparatus that targets the removal of $CO_2$ composition from the exhaust gas is included. In addition, in accordance with one or more embodiments, an activated carbon section or sections may be added to reduce the remaining pollutants such as $NO_x$, $SO_x$, HCl, Hg, and Hg(II). While the embodiments disclosed herein show the stages of the multi-pollution abatement device in a particular order, the order or number of stages is not limited merely to those arrangements disclosed herein. One of ordinary skill will appreciate that any number of stages in any sequential arrangement may be used without departing from the scope of the present disclosure. For example, any number of economizer, fogger, demister, and activated carbon stages may be employed without departing from the scope of the present disclosure. Accordingly, one or more embodiments of the present invention provide a versatile, modular multi-pollution abatement device that is adaptable for removing pollutants from many different types of industrial exhaust gas streams.

A multi-pollution abatement device in accordance with one or more embodiments of the invention may be deployed for removing pollutants from an exhaust gas stream generated from an industrial plant, e.g., in processing and manufacturing for a number of market sectors, including, but not limited to, food processing and packaging, pulp and paper, printing, chemicals and allied products, rubber, plastics, hospitals, universities, metal industries, drug manufacturing, wastewater and sewage treatment, beverages, utilities, incineration, steel, cosmetics, textile production, electronics, and petroleum refining.

For removal of the unwanted and or targeted pollutants such as $NO_x$, $SO_x$, HCl, Hg, Hg(II), $CO_2$, and particulate certain reactions must occur. Some examples of such reactions and methods and devices for removing pollutants from an exhaust gas stream are described below.

NO$_x$

NO$_x$ is a generic term for the mono-nitrogen oxides nitric oxide (NO) and nitrogen dioxide (NO$_2$). Both NO and NO$_2$ are produced from the reaction of nitrogen and oxygen in the air during combustion. NO$_2$ may be removed by contacting the NO$_2$ with water vapor or steam, condensing the water vapor or steam out of the flue gas stream to create wastewater, and then collecting and directed the wastewater to a waste water treatment facility where it is neutralized and disposed of NO cannot be removed by contact with water so NO has to first be chemically changed to NO$_2$, which is achieved by adding ozone (O$_3$) to the exhaust gas stream. The introduction of ozone gas into the flue gas stream causes the following reaction to occur:

$$NO+O_3 \rightarrow NO_2+O_2$$

SO$_x$

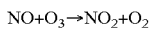

SO$_x$ is a generic term for the sulfur oxides SO$_2$ and SO$_3$. These oxides are formed as a result of combustion of a sulfur-containing fossil fuel such as coal or oil. With moisture in the combustion some of the SO$_2$ will be converted to SO$_3$. By adding a solution of hydrogen peroxide (H$_2$O$_2$) to the water at, e.g., a 5% concentration, the SO$_2$ and SO$_3$ that come into contact with the solution can quickly be converted to H$_2$SO$_4$(aq) wastewater. The wastewater is then condensed out of the flue gas stream and directed to a waste water facility for neutralization and disposal.

HCl

Hydrogen Chloride (HCl) is a monoprotic acid. This composition can be removed when it comes into contact with water. In aqueous hydrochloric acid, the H$^+$ joins a water molecule to form a hydronium ion, H$_3$O$^+$ $$HCl+H_2O \rightarrow H_3O^++Cl^-$$

Hg(0) and Hg(II)

Under normal conditions, mercury is extremely stable, does not oxidize readily, and is typically found as elemental mercury (Hg(0)). During the combustion of a fossil fuel such as coal, Hg(0) may be volatilized and converted to vapor. Furthermore, some of this Hg(0) vapor may be converted to ionic mercury (Hg(II)) compounds through oxidation reactions in the flue gas. Hg(II) compounds are generally water-soluble and, thus, can be removed by contacting the Hg(II) compound with water (vapor or steam), condensing the vapor or steam to form waste water, and directing the wastewater to a wastewater facility. However, Hg(0) vapor is insoluble in water and thus cannot be removed by contact with water. Fortunately, at flue gas temperatures Hg(0) will react with gaseous Cl to form mercuric chloride (HgCl$_2$), which is water-soluble and, thus, may be removed by contact with water (vapor, steam, or liquid).

CO$_2$

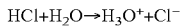

Carbon dioxide (CO$_2$) is a chemical compound composed of two oxygen atoms covalently bonded to a single carbon atom. CO$_2$ is soluble in water and, when contacted with water, reversibly converts to carbonic acid (H$_2$CO$_3$). However, the majority of the CO$_2$ is not converted to H$_2$CO$_3$ but remains in the water as dissolved CO$_2$. Accordingly, if any energy is applied to the water such as a vibration, low frequency wave or heat, the CO$_2$ molecule can escape to atmosphere. Accordingly, in order to hold the CO$_2$ molecule in the water, chilled water and/or a water solution such as amine (e.g., RNH$_2$) should be present to absorb the CO$_2$.

FIG. 1 shows a multi-pollution abatement device 101 in accordance with one or more embodiments of the invention. The multi-pollution abatement device 101 may be deployed with a fossil fuel fired boiler or furnace, as shown, with the associated equipment such as a waste heat boiler and an electrostatic precipitator when using coal as a choice fuel. The system includes an O$_3$ aspirator 102 with the associated equipment such as ozone generator 103 and oxygen (O$_2$) supply 104. The system further includes a heat reclaim coil 105, e.g., an economizer, to extract exhaust gas heat. The system further includes a heat exchanger 106 and a combustion air preheater 107 for energy savings of the system. The system includes a first stage fogging array 108 with a high pressure pump 109, a water supply 110 and an H$_2$O$_2$ supply 111. The system includes condensing medium 112, e.g. a demister, that is connected to a drain pipe to direct all liquid waste to a waste water facility 117. The system further includes a second stage fogging array 113 that includes high pressure pump 114 and a water supply 115 with a second condensing medium 116, e.g., a demister, following the second stage fogging array 113. The system further includes, a third stage fogging array 118 with associated equipment, such as high pressure pump 119, cooling unit 120, water supply 121, and an amine solution storage system 122. The system further includes a third condensing medium 123, e.g., a demister 123, and connecting pipe leading to a captured CO$_2$ solution center 124. On the output of the system is an activated carbon frame section 125 and an exhaust fan 126.

Referring to FIG. 1, one of ordinary skill in the art will appreciate that embodiments of the invention are not limited only to the configuration shown in FIG. 1. Each component shown in FIG. 1, as well as any other component implied and described but not shown in FIG. 1, may be configured to receive material from one component (i.e., an upstream component) of the system and send material (either the same as the material received or material that has been altered in some way) to another component (i.e., a downstream component) of the system. In all cases, the material received from the upstream component may be delivered through a series of pipes, pumps, or the like. Furthermore, while the embodiments of FIG. 1 show the stages of the multi-pollution abatement device in a particular order, the order or number of stages is not limited merely to those arrangements shown. One of ordinary skill will appreciate that any number of stages in any sequential arrangement may be used without departing from the scope of the present disclosure. For example, any number of economizer, fogger, demister, and activated carbon stages may be employed without departing from the scope of the present disclosure.

Figure 2:
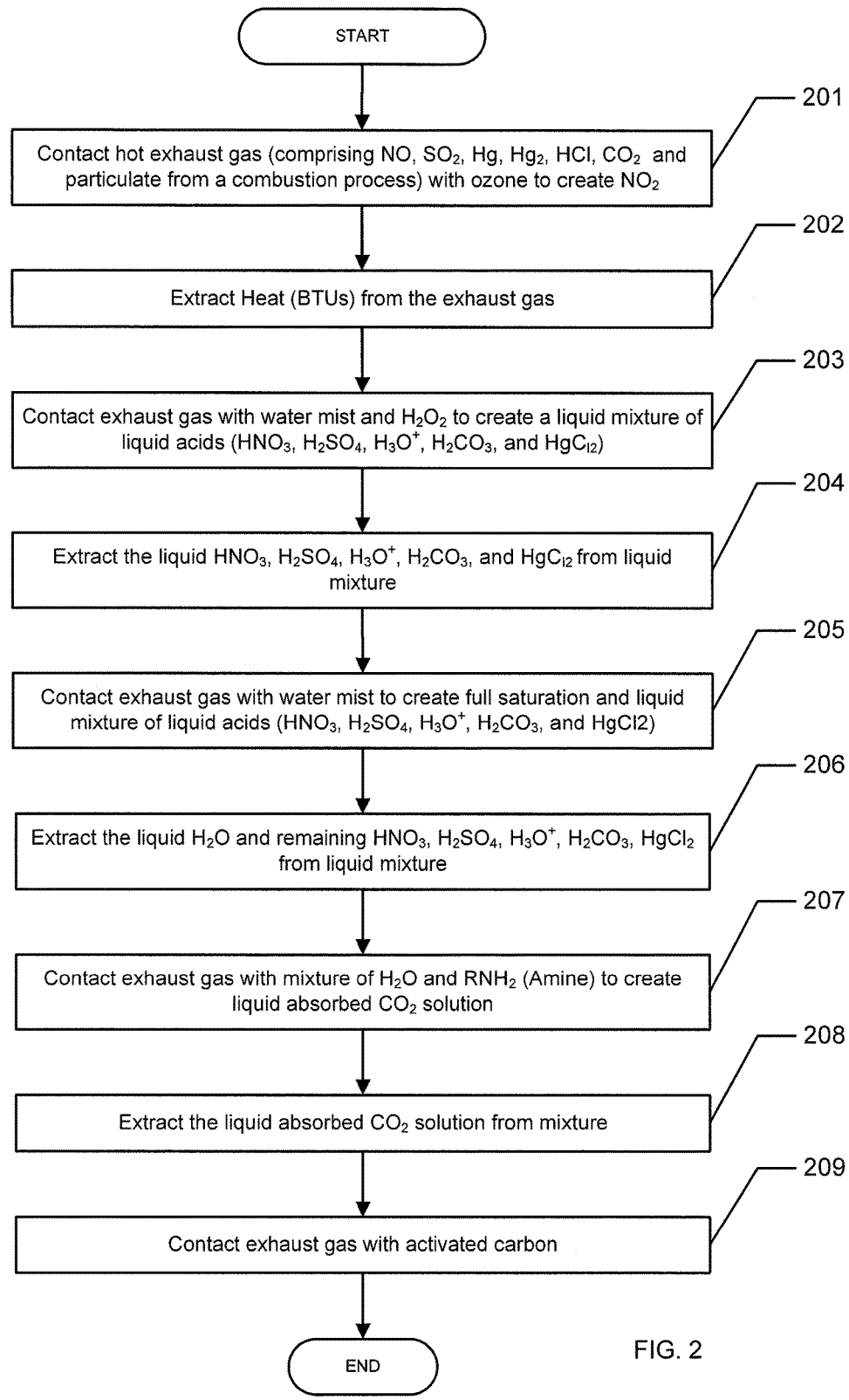
FIG. 2 shows a flow chart describing a method of multi-pollution abatement using coal or oil as a fossil fuel in accordance with one or more embodiments of the invention.

FIG. 2 shows a flow chart describing a method of multi-pollution abatement using coal or oil as a fossil fuel in accordance with one or more embodiments of the invention. Referring to FIG. 2, in Step 201, the stream of exhaust gas is brought into contact with ozone O$_3$ to convert NO present in the exhaust gas to NO$_2$. In Step 202, the stream of exhaust gas comes into contact with an economizer that extracts heat from the exhaust gas that is later reused in the system to generate an energy savings. In Step 203, the stream of exhaust gas is brought into contact with a mist of water and H$_2$O$_2$ to create a mixture of liquid acids. In accordance with one or more embodiments, the stream of exhaust gas may include one or more of NO, NO$_2$, SO$_2$, Hg, Hg$_2$, HCl, CO$_2$ and particulate generated during a typical fossil fuel combustion process. Accordingly, the mixture of liquid acids formed in Step 203 may include one or more of HNO$_3$, H$_2$SO$_4$, H$_2$CO$_3$, HgCl$_2$, and wastewater. The mixture may also include other chemicals and/or materials.

In Step 204, the liquid acid waste water mixture are extracted from the exhaust stream, e.g., by coming into contact with a condensing media such as a demister. In Step 205, the remaining compositions in the exhaust stream such as NO, $NO_2$, $SO_2$, Hg, $Hg_2$, HCl, $CO_2$, and particulate are brought into contact with a second water mist to create a mixture of liquid acids $HNO_3$, $H_2SO_4$, $H_2CO_3$, $HgCl_2$ and wastewater. In Step 206, the liquid acid and waste water mixture is extracted from the stream of exhaust gas, e.g., by coming into contact with a second condensing media such as a demister. In Step 207, the exhaust gas stream that now includes mostly $CO_2$ is brought into contact with a mist that includes a chilled amine (e.g., MEA denoted as $RNH_2$, or the like) solution to absorb the $CO_2$ molecule and create a liquid absorbed $CO_2$ solution.

In accordance with one or more embodiments, the chilled amine solution mist may be maintained at a temperature at, or near, 50-55 degrees F. to ensure that the amine and $CO_2$ stay as a chemical formation. Furthermore, in accordance with one or more embodiments, the amine absorbs the $CO_2$ and serves as the starting base for an alcohol such as COOH or ROH depending on which amines are used. The amines and $CO_2$ will separate if heated above 180 degrees F. and, thus, the chilled water is beneficial to ensure that the proper temperatures are maintained despite the potentially high temperature (up to 300 degrees F.) of the exhaust gas. Furthermore, in accordance with one or more embodiments, in a natural gas fired application, as described in more detail below, the amine solution may be used to absorb the $CO_2$ and distillation of the solution is not necessary, but rather, aluminum lithium hydrate may be added to the solution. As described in more detail in U.S. Pat. No. 8,084,652, which is incorporated by reference herein in its entirety.

In Step 208, the liquid absorbed $CO_2$ is extracted from the exhaust gas stream, e.g., by coming into contact with a third condensing media such as a demister. In Step 209, the exhaust gas stream that now includes very small amounts of NO, $NO_2$, $SO_2$, Hg, $Hg_2$, and HCl, comes into contact with an activated carbon stage (e.g., a granulated carbon frame section, as described in more detail below, in reference to FIGS. 5 and 8) where the now small traces (less than 3 ppm) of the NO, $NO_2$, $SO_2$, Hg, $Hg_2$, HCl, are absorbed into the granular activated carbon.

Figure 3:
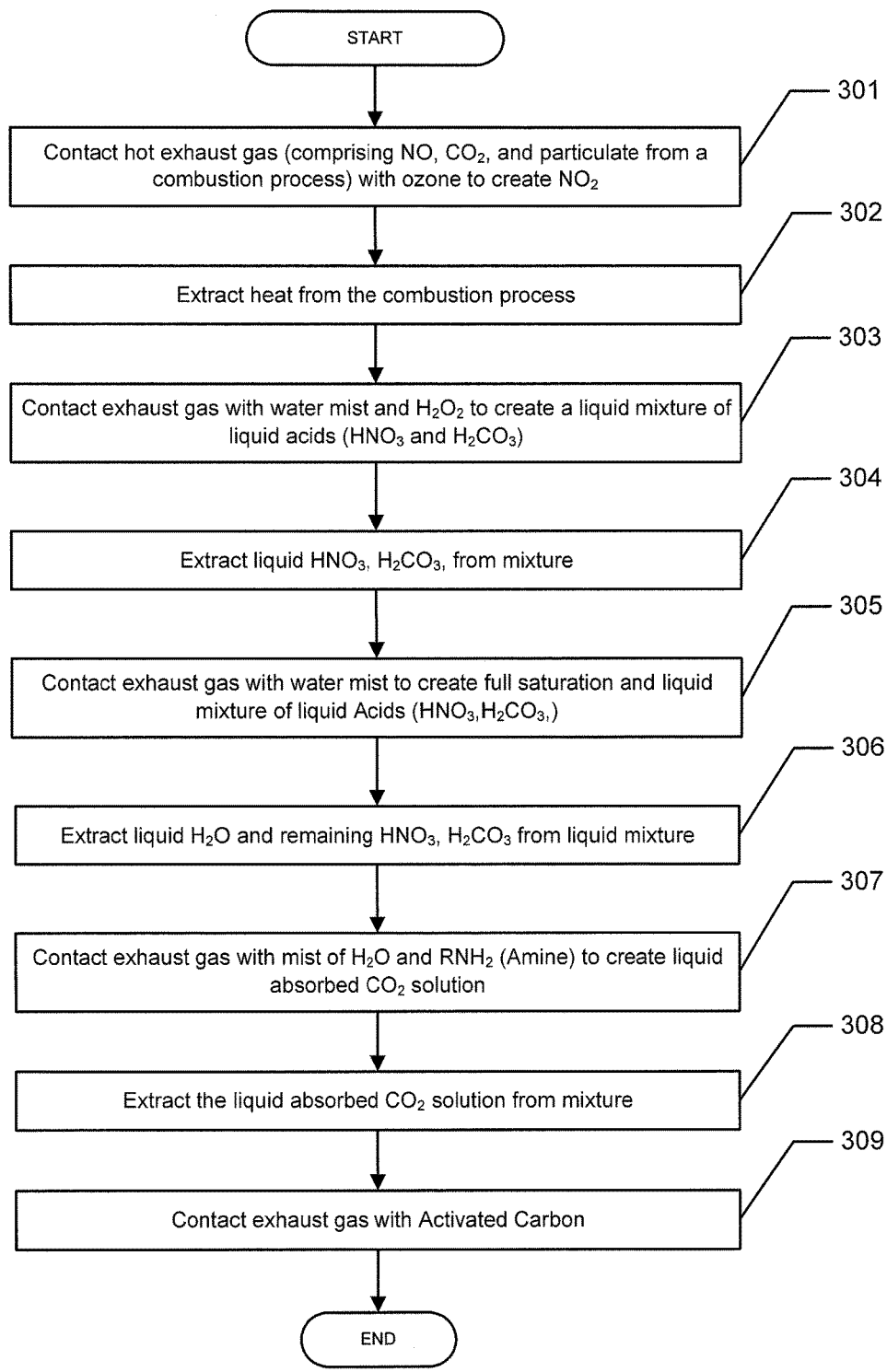
FIG. 3 shows a flowchart describing a method of multi-pollution abatement using natural gas as a fossil fuel in accordance with one or more embodiments of the invention.

FIG. 3 shows a flowchart describing a method of multi-pollution abatement using natural gas as a fossil fuel in accordance with one or more embodiments of the invention. In Step 301, a stream of exhaust gas that includes at least NO, $CO_2$, and particulate, and is generated during combustion of natural gas is brought into contact with $O_3$ to convert the NO to $NO_2$. In Step 302, the stream of exhaust gas comes into contact with an economizer where the heat of the exhaust gas is extracted and used to generate an energy savings for the system. In Step 303, the stream of exhaust gas that includes $NO_2$, $CO_2$ and particulate is brought into contact with a mist of water and $H_2O_2$ to create a mixture of liquid acids $HNO_3$, $H_2CO_3$, and wastewater. The mixture may also include other chemicals and/or materials.

In Step 304, the liquid acids and waste water are extracted from the exhaust stream by, e.g., bringing them into contact with a condensing media such as a demister. In Step 305, the remaining compositions in the exhaust stream such as $NO_2$, $CO_2$ and particulate are brought into contact with a water mist to create a mixture of acids including $HNO_3$, $H_2CO_3$, and wastewater. In Step 306, the liquid acids and wastewater are extracted from the exhaust gas stream, e.g., by bringing them into contact with a second condensing media such as a demister. In Step 307, the exhaust gas stream that now includes mostly $CO_2$ is brought into contact with a mist formed from a chilled amine solution mist to absorb the $CO_2$ molecule and to create a liquid absorbed $CO_2$ solution. In Step 308, the liquid absorbed $CO_2$ solution is extracted from the exhaust stream by, e.g., contacting the solution with a third condensing media such as a demister. In Step 309, the exhaust gas stream that now includes very small amounts of $NO_2$, comes in contact with an activated carbon stage (e.g., a granulated carbon frame section, as described in more detail below, in reference to FIGS. 5 and 8) where the now small traces (less than 3 ppm) of $NO_2$, are absorbed in the granular activated carbon.

Figure 4:
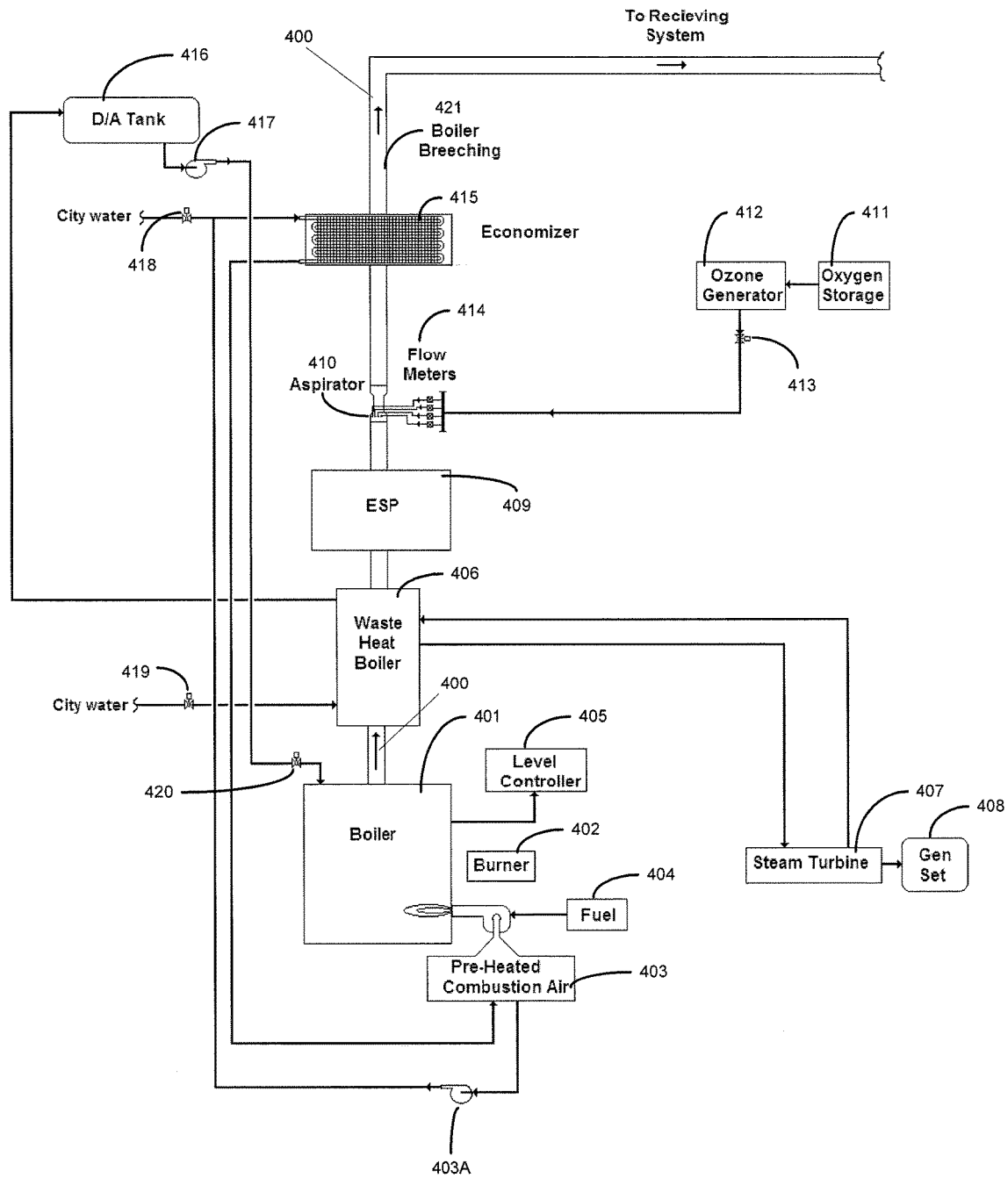
FIG. 4 shows a system for creating an exhaust gas stream that includes NO, $NO_2$, $SO_2$, HCl, Hg, $Hg_2$, $CO_2$ and particulate from a combustion process in accordance with one or more embodiments of the invention.

FIG. 4 shows a system for creating an exhaust gas stream including NO, $NO_2$, $SO_2$, HCl, Hg, $Hg_2$, $CO_2$ and particulate from a combustion process in accordance with one or more embodiments of the invention. In one or more embodiments, the boiler 401 is a fire-tube or water-tube boiler capable of producing millions of BTUs of steam per hour for producing electricity. The boiler 401 may utilize a conventional design that includes a burner 402 that receives a controlled quantity of pre-heated combustion air 403 and fuel 404 (e.g., coal) with the safety of a level controller 405 to ensure proper boiler feed water level.

The boiler exhaust gas 400 may flow through a waste heat boiler 406 that removes heat from the exhaust gas after it exits the boiler. The waste heat boiler 406 produces high temperature, high pressure steam that drives a steam turbine 407 that in turn produces electricity through a generator set 408 to use at the facility or sell. As the exhaust gas is directed from the waste heat boiler 406 to an electrostatic precipitator 409 (ESP) where particulate matter such as fly ash and other large particulate matter is removed from the exhaust gas stream.

The ESP is an effective treatment for removing particulate such as fine dust, smoke, fumes, and fly-ash in a limited space. Produced within an ESP is a unidirectional electrostatic field between two electrodes that sweeps the dust from the exhaust gas stream as it passes through the field. The dust or fly-ash is deposited upon the outer surface of the chamber where it is removed by periodic shaking. A typical ESP includes of a bundle of vertical metallic tubes through which the exhaust gas stream flows. Through the center of each tube is a wire electrode that is fixed to and insulated from the tube. The positive pole of a high voltage direct current is attached to the center electrodes and the negative to the tubes. When the voltage is applied, the dust particles are charged and move transversely in the field until the particles reach the chamber wall.

After passing through the ESP 409, the exhaust gas stream 400 is then directed through an $O_3$ aspirator 410. The $O_3$ aspirator 410 is supplied with $O_3$ by an ozone generator 412 via a control valve (413) and a series of flow meters (414) that measure the linear volumetric flow rate of the $O_3$ directed to the aspirator 410. The ozone generator 412 is supplied with oxygen by an oxygen storage facility 411.

In accordance with one or more embodiments, the aspirator 410 is a flow-through nozzle device in which the kinetic energy of the substance being aspirated is increased in an adiabatic process. More specifically, in accordance with one or more embodiments, at the input end, the body of the aspirator forms a converging nozzle which decreases the flow area within the exhaust gas breeching and then, after a few feet, the body of the aspirator forms a diverging nozzle which increases the flow area of the exhaust gas breeching. This increase in kinetic energy involves a decrease in pressure and accomplished by the change in the flow area. The aspirator 410 may be a mechanical device that introduces ozone into the flow of flue gas through a nozzle where the ozone is mixed with the flue gas flow using the ozone as an oxidizing agent to convert nitric oxide (NO) to nitrogen dioxide ($NO_2$). In one or more embodiments, the ozone is introduced to the flue gas at 1:1 (stoichiometric) concentration. Accordingly, the introduction of ozone gas into the exhaust gas stream causes the following reaction to occur:

$$NO+O_3 \rightarrow NO_2+O_2$$

The exhaust gas then passes through an economizer that may be a forced-flow, once through conversion heat transfer device, usually formed from steel tubes, to which feed-water is supplied at a pressure above that of the steam generating section and at a rate corresponding to the steam output of the boiler unit.

In accordance with one or more embodiments, any number of different types, or classifications, of economizers may be employed in the system without departing from the scope of the present disclosure. Generally, economizers are classified in a number of different ways. For example, an economizer may be classified as horizontal or vertical-tube type, according to its geometrical arrangement. An economizer may also be classified as longitudinal or cross flow, depending upon the direction of gas-flow with respect to the tubes of the economizer. An economizer may further be characterized as parallel or counter flow, with respect to the relative direction of gas and water flow. An economizer may still further be characterized as steaming or non-steaming, depending on the thermal performance. Other examples of economizer classification include return-bend or continuous-tube (depending upon the details of design) and base-tube or extended-surface (according to the type of heat-absorbing surface). Staggered or in-line tube arrangements may be used in an economizer. The arrangement of tubes in an economizer affects a number of factors, including but not limited to the gas flow through the tube bank, the draft loss, the heat transfer characteristics, and the ease of cleaning Returning to FIG. 4, heat from the exhaust gas stream is transferred by the economizer 415 to the preheated combustion air stage 403 by way of a heat transfer fluid, e.g., water, that flows through a series of pipes and valves to the pre-heated combustion air stage 403. After being transferred into the combustion air within the pre-heated combustion air stage 403, the heat is then returned to the economizer 415 through a circulation pump 403a. In the event that water is lost due to evaporation in the economizer, city water may be added through control valve 418.

Furthermore, water in the boiler 401 that is lost to steam may be replenished by water (commonly called "boiler make-up" or "boiler feed water") supplied by a pump 417 from a source of water (not shown) through a deaeration (D/A) tank 416. From the D/A tank 416, the boiler feed water may be fed by a boiler feed pump 417 through a controlled modulating boiler feed valve 420 to the boiler. In one or more embodiments, the boiler feed valve 420 may be regulated by the level controller 405 to maintain a preselected volume of boiler feed water in the boiler 401. Furthermore, water that is lost to steam in the waste heat boiler 406 may be replenished by city water directed through control valve 419 to the waste heat boiler 406.

In accordance with one or more embodiments, the exhaust gas that exits the economizer is at a temperature of about 220 F and is then sent through breeching 421 to a receiving system (not shown).

Figure 5:
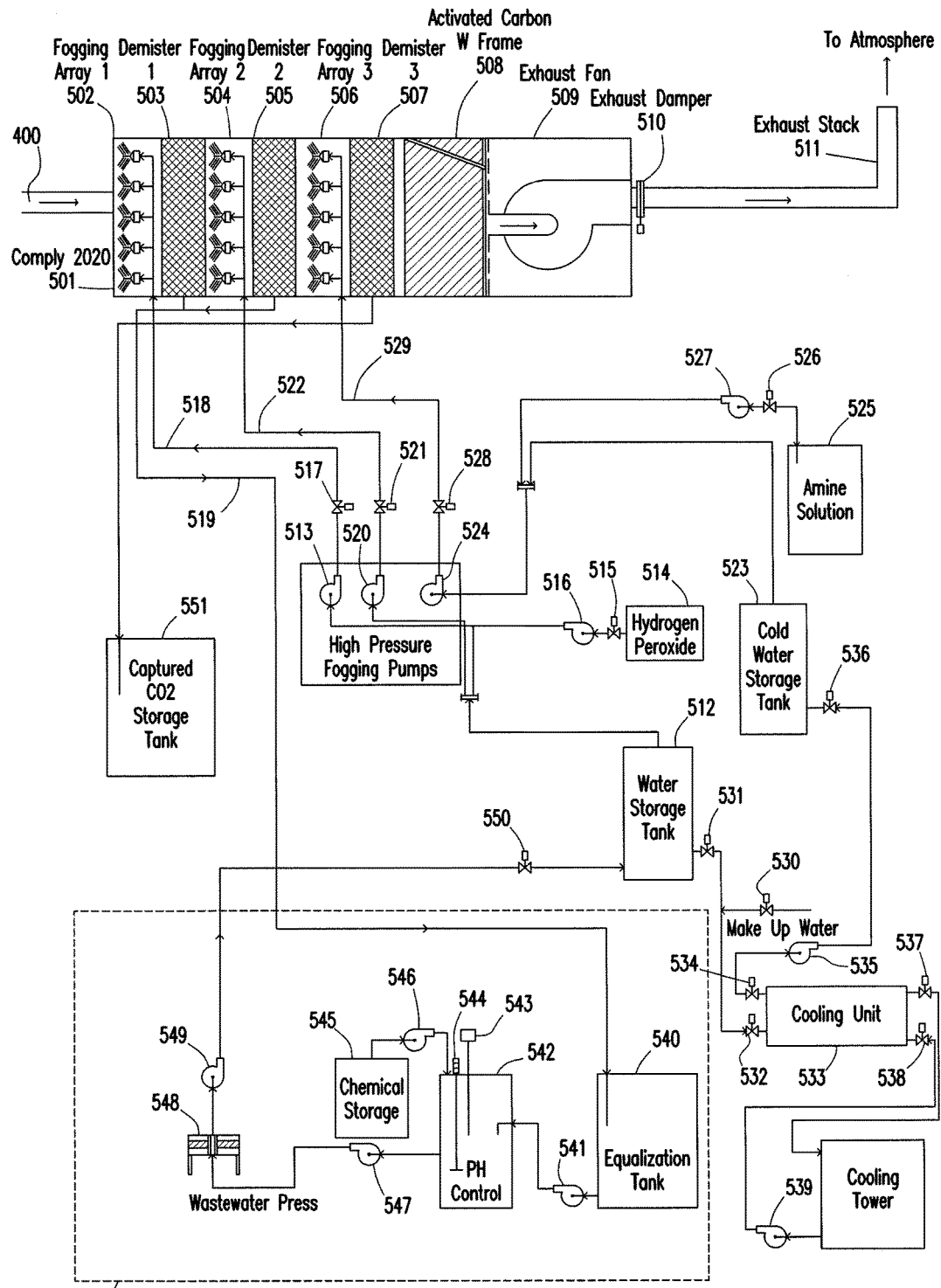
FIG. 5 shows a receiving system to receive a stream of exhaust gas in accordance with one or more embodiments of the invention.

An example, shown in FIG. 5, describes a receiving system to receive a stream of exhaust gas in accordance with one or more embodiments of the invention. Specifically, the receiving system in FIG. 5 represents one example of a multi-pollution abatement device in accordance with one or more embodiments of the invention. In this example, a stream of exhaust gas 400 from an economizer, e.g., as described above with respect to FIG. 4, is directed into a multi-pollution abatement unit 501. The multi-pollution abatement unit 501 includes a first stage fogging array 502 condensing media 503, second stage fogging array 504, second condensing media 505, third stage fogging array 506, a third condensing media 507 and an activated carbon section 508, with an exhaust fan 509 to direct the clean exhaust gas through the exhaust damper 510 to the exhaust stack 511.

The exhaust gas 400 enters the multi-pollution abatement unit 501 and comes into contact with the first fogging array 502 where the exhaust gas encounters a high pressure liquid solution fog directed against the exhaust gas flow for creating a hydrolysis reaction. As used herein, a hydrolysis reaction is a chemical reaction of a compound (or compositions) with water, resulting in a formation of one or more new compounds (or compositions). Each fogger in the fogging array 502 may be configured to release high pressure liquid solution fog. The fog is formed of small droplets (about 10 microns in diameter) and the fog covers a large surface area. For example FIG. 5 shows a fogging array 502 that is a series of fogging nozzles connected to piping and fittings within the multi-pollution abatement unit 501. Accordingly, the array creates a fog pattern that sprays against the exhaust gas flow to ensure contact with the exhaust gas composition. Advantageously, the combination of small droplets and large surface area provides for reaction of the high pressure liquid solution fog with the various pollutants within the exhaust gas stream.

In accordance with one or more embodiments, the liquid solution used to generate the fog for fogging array 502 originates from the water storage tank 512, where city water or reverse osmosis water is collected and stored. A high pressure fogging pump 513 draws the water from the water storage tank 512 to the fogging array at the same time a chemical pump 516 sends liquid $H_2O_2$ from a $H_2O_2$ storage tank to the high pressure fogging pump 513. The amount of $H_2O_2$ that is mixed with the water e.g., within the high pressure fogging pump 513, is modulated by a control valve 515 before being directed to the fogging array 502. From the high pressure fogging pump 513, the mixed solution is directed through a control valve 517 where the mixed solution is modulated to allow a proper amount of solution to be applied to the exhaust gas stream. The mixed solution is sent to the fogging nozzles of fogging array 502 by way of a series of piping and fittings 518. The mixed solution sprayed by the fogging array nozzles of the fogging array 502 is sprayed under a pressure of approximately 1000 psi to 3000 psi to achieve maximum hydrolysis within the exhaust gas stream. The droplets of the liquid solution absorb contaminants such as $NO_2$, $SO_2$, HCl, Hg(0), and Hg(II)

For example, the introduction of the mixed liquid solution of $H_2O_2$ and $H_2O$ into the exhaust gas may cause the following reactions to occur:

$$SO_2+H_2O_2 \rightarrow H_2SO_4$$

$$3NO_2+H_2O \rightarrow 2HNO_3+NO$$

$$HCl+H_2O \rightarrow H_3O^{+1}+Cl^{-1}$$

$$Hg_2^{2}+2Cl^{-1} \rightarrow Hg_2Cl_2$$

In accordance with one or more embodiments, the exhaust gas, after passing through the first high pressure fogging array 502, comes in contact with a first condensing medium 503, e.g., a demister. The saturated exhaust gas develops a wetted film on the first condensing medium 503, where the acids $H_2SO_4$, $HNO_3$, $(H_3O^{+1})(Cl^{-1})$, and $Hg_2Cl_2$ are captured and directed, under gravity, to the drain piping and fitting 519. The drain piping and fitting 519 directs the concentrated acids to an equalization tank 540 where the acids are contained. The acids are then distributed to either a neutralization process or sent on to a separation process such as that described in U.S. Pat. No. 8,084,652, incorporated by reference herein in its entirety.

As used herein, the term condensing medium includes any demister device that enhances the removal of liquid droplets entrained in an exhaust gas stream. For example, mesh type coalesce, vane pack, or other structures intended to aggregate the mist into droplets that are heavy enough to separate from the exhaust gas stream may be employed. Advantageously, demisters as used within the system serve to reduce the residence time required to separate a given liquid droplet size. One of ordinary skill having the benefit of this disclosure will appreciate that there exists many different types of demisters, e.g., demisters that are made from knitted materials with interlocking asymmetrical loops of metal or plastic with typical diameters being 0.1 to 0.3 mm. These types of demisters have high removal efficiencies of water droplets and low pressure drops. Accordingly, one or more embodiments of the invention may employ any demister known in the art or to be developed.

FIG. 5 further shows an example of a neutralization system 552, where the contained acids in the equalization tank 540 are directed through a wastewater pump 541 to a PH control tank 542 where the acids are mixed with a chemical such as limestone to neutralize the acids, making them safe to dispose of. When the acids enter the PH control tank 542, an automatic PH control sensor 543 sends a signal to the chemical storage tank 545 to send a controlled amount of chemical (limestone) to the PH control tank 542 through a chemical pump 546 to be mixed with the acid liquids to neutralize the acids. The PH control tank has a chemical mixer 544 that mixes the chemical as it is received in the PH control tank. The neutralized acids now described as salts are directed from the PH control tank 542 through a wastewater pump 547 to a wastewater press 548 where the salts and particles are pressed to squeeze out the water so there is only wet solids remaining. The water that has been separated from the solids is re-directed through a water pump 549 back to the water storage tank 512 where the water is re-used in the process. An automated control valve 550 controls the volume and flow of the re-cycle water going to the water storage tank 512.

After the exhaust gas passes through the first demister 503, the exhaust gas comes into contact with the second high pressure fogging array 504. The second high pressure fogging array 504 may be configured to release high pressure liquid solution fog having droplets that are very small (about 10 microns in diameter) and cover a large surface area, thereby allowing the high pressure liquid solution fog to react to the various pollutants within the exhaust gas stream that were not converted or captured by the first stage of the system. A high pressure fogging pump 520 draws the water to the fogging array 504 from the water storage tank 512. The amount of water and water pressure is modulated by control valve 521 that delivers the water through a network of piping 522 to the second stage high pressure fogging array 504.

In one or more embodiments, the exhaust gas after passing through the second high pressure fogging array 504 becomes saturated then comes in contact with the second condensing media 505, e.g., a demister. The saturated exhaust gas develops a wetted film on the demister 505 where the acids $H_2SO_4$, $HNO_3$, $H_3OCl$, $Hg_2Cl_2$ are captured, and through gravity are directed to the drain piping and fitting 519. After the exhaust gas passes through the second demister 505, the exhaust gas comes in contact with the a third high pressure fogging array 506 where exhaust gas still containing a large amount of $CO_2$ contaminant reacts with the liquid which is mixed with a reactant solution, e.g., an amine solution, to remove $CO_2$ from the exhaust gases.

As used herein, the term amine solution refers to a group of aqueous solutions of various alkylamines. For example, in accordance with one or more embodiments, many different amines may be used without departing from the scope of the present disclosure, e.g., monoethanolamine (MEA), diethanolamine (DEA), methyldiethanolime (MDEA), diisopropylamine (DIPA), and aminoethoxyethanol (DGA). In accordance with one embodiment, MDEA is used to remove large amounts, approximately 90% of $CO_2$. For example, in an exhaust gas having approximately 1,000 pounds of $CO_2$, the amine solution would remove approximately 900 pounds of the $CO_2$. Furthermore, in such cases where a large degree of $CO_2$ removal is necessary, the third high pressure fogging array 506 may be configured to spray the high pressure amine mixture fog against the exhaust gas flow (i.e., the fog is sprayed in a direction generally opposing (or antiparallel) the flow direction of the exhaust gas). This advantageously improves contact with the exhaust gas composition resulting in an increase in the rate of $CO_2$-MDEA reaction as compared to a non-opposing, e.g., co-directional or parallel, flow configuration.

In accordance with one or more embodiments the invention, $CO_2$ reacts with primary and secondary amines to form carbamate according to the following chemical reaction

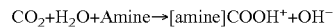
$$CO_2 + H_2O + \text{Amine} \rightarrow [\text{amine}]COOH^+ + OH^-$$

Because MDEA is a tertiary amine and does not have a hydrogen attached to the nitrogen, the $CO_2$ reaction can only occur after the $CO_2$ dissolves in water to form bicarbonate ion. The bicarbonate ion then undergoes an acid-base reaction with the amine to yield the overall $CO_2$ reaction:

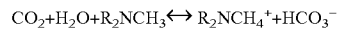
$$CO_2 + H_2O + R_2NCH_3 \leftrightarrow R_2NCH_4^+ + HCO_3^-$$

In accordance with one or more embodiments, the $CO_2$ molecule is dissolved into the water by applying a cold water solution having a temperature of 55 F or below to effectively capture and contain the $CO_2$ molecule in the solution.

Returning to FIG. 5, a water make-up water valve 530 delivers, e.g., city water, when required, to a water cooling unit control valve 532 that controls the quantity and flow to the water cooling unit 533. In accordance with one or more embodiments, the water cooling unit 533 cools the water from ambient temperature to approximately 55 F. The cold water is directed from the water cooling unit 533 through another control valve 534 to a cooling pump 535. The cooling pump 535 directs the cold water through a flow meter 536 and into a cold water storage tank 523. The water cooling unit 533 is cooled by a separate condenser water loop and connected to outdoor cooling tower to expel heat to the atmosphere. The condenser water from the water cooling unit 533 is directed through a control valve 537 to maintain a specific flow and sent to a cooling tower where the heat is extracted. From the cooling tower the condenser water is directed through a condenser pump 539 then sent back to the water cooling unit 533 through a flow meter 538 where the condenser water starts its cooling cycle again.

From the cold water storage tank 523, the cold water is directed to a network of piping and fittings where the cold water is mixed with amine solution 525. The amine solution is directed through a chemical meter 526 and a chemical pump 527 where the amine solution is sent through a network of piping and mixed with the cold water. In accordance with one or more embodiments, the amine is mixed with the water at 40% concentration of the amine solution, however, other mixing rations may be used without departing from the scope of the present disclosure. The mixed solution is then directed through a high pressure pump 524 where the mixed solution is sent through a control valve 528 that modulates the flow and pressure of the mixture. The mixture is sent to the high pressure fogging array 506 via a network of piping and fittings 529. The mixed solution is sprayed by the high pressure fogging array 506 thereby directing a high pressure fog against the exhaust gas flow to create a hydrolysis reaction. The hydrolysis reaction captures the $CO_2$ and creates a liquid absorbed $CO_2$ solution.

The exhaust gas then passes a third demister 507 where the liquid absorbed $CO_2$ solution condenses on the demister. The condensed liquid falls under gravity and is directed to a drain and a network of piping to a separate $CO_2$ storage tank 551. In accordance with one or more embodiments, the captured liquid may be sent to a further process where the liquid can be converted to alcohol as described in U.S. Pat. No. 8,084,652 the disclosure if which is incorporated by reference herein in its entirety.

After passing through the third demister 507, the exhaust gas comes into contact with the activated carbon frame section 508. More specifically, by contacting the activated carbon frame section 508, the exhaust gas passes through a granular activated carbon field, as described in more detail below in reference to FIG. 8. As used herein the term granular activated carbon is used to describe activated carbon that has a relatively large particle size compared to powder activated carbon. However, powder activated carbon creates a large pressure drop in the exhaust gas. Advantageously, granular activated carbon creates a lower pressure drop, thereby requiring less energy to ultimately expel the exhaust gas from the system.

Advantageously, in the multi-pollution abatement process described herein, where the exhaust gas passes through a series of stages such as a first high pressure fogging array 502 and first demister 503, a second high pressure fogging array 504 and second demister 505, and a third high pressure fogging array 506 and third demister 507 can remove up to 98% of the targeted pollutants (except $CO_2$), leaving only small amounts of targeted pollutants still in the exhaust gas.

It is well known in the industry that exhaust gases produced from a fossil fuel, the pollutants are measured and monitored in ppm (parts per million). Parts per million is the mass ratio between the pollutant component and the solution and the ppm is defined as: ppm=1,000,000 MC/MS, where MC=mass of component (Kg, lbm) and MS=mass solution (Kg, lbm).

With the activated carbon frame section, the granular activated carbon will absorb the targeted pollutants such as $NO$, $NO_2$, $SO_2$, $HCl$, $Hg(0)$, and $Hg(II)$ reducing the remaining pollutants, e.g., from 10 ppm to 2 ppm. In accordance with one or more embodiments, the activated carbon frame section is a screened frame section, which holds granular activated carbon pieces freely and can be replaced on a regular basis, as described in more detail below in reference to FIG. 8. A gram of activated carbon can have a surface area in excess of 500 $m^2$ with 1500 $m^2$ being readily achievable. When the activated carbon cannot adsorb anymore molecules it can easily be replaced with new activated carbon and the old activated carbon can be shipped to be re-activated or disposed of. Furthermore, the granular activated carbon absorbs the targeted pollutant molecule as the exhaust gas passes through the granular activated carbon field.

Returning to FIG. 5, after the exhaust gas passes through the activated carbon frame section 508, the exhaust gas is forced through an exhaust fan 509 that is necessary to maintain sufficient pressure to overcome the resistance to flow imposed by the burning equipment, tube banks, directional turns, fogging arrays, demisters and activated carbon section and flue and dampers in the system. The resistance to air and gas flow depends upon the arrangement of the equipment and varies with the rate of flow and the temperatures of the air and gas. The exhaust fan 509 can be but are not limited to a high quality, high efficiency airfoil fan, where the fan has unique adjustable discharge position wherein the housing can be easily rotated to any one of four positions.

After the exhaust gas is guided out of the exhaust fan through a set of dampers 510. The dampers 510 are normally open during unit operational time and normally closed when the unit is not operating. After passing through the dampers 510, the exhaust gas is directed to atmosphere through an exhaust stack 511.

Furthermore, while the embodiments of FIG. 5 show the stages of the multi-pollution abatement device in a particular order, the order or number of stages is not limited merely to those arrangements shown. One of ordinary skill will appreciate that any number of stages in any sequential arrangement may be used without departing from the scope of the present disclosure. For example, any number of economizer, fogger, demister, and activated carbon stages may be employed without departing from the scope of the present disclosure.

FIGS. 6A-6D show various views of a modular system for multi-pollutant abatement in accordance with one or more embodiments of the invention. In accordance with one or more embodiments, the unit is built from modular sections 601-610, thereby allowing the units to be fitted and sized exactly with plant specifications. Turning to FIG. 6A, a top view of a modular system for multi-pollutant abatement in accordance with one or more embodiments of the invention is shown. The first section 601, is fitted to house a first high pressure fogging array (e.g., high pressure fogging array 502), where the second section 602 is fitted to house the first demister (e.g., demister 503). The third section 603 houses the second high pressure fogging array (e.g., high pressure fogging array 504) and the fourth section 604 houses the second demister (e.g., demister 505). The fifth section 605 is fitted to and houses the third fogging array (e.g., high pressure fogging array 506) used for capturing the $CO_2$ with the sixth section 606 fitted to house the third demister (e.g., demister 507). The seventh section 607 is fitted to house the granular activated carbon frame section 508 (e.g., a granular activated carbon W-frame, as described in more detail below in reference to FIG. 8). On the top and bottom of seventh section 607 are a series of doors 608 that open to add activated carbon on the top and dispose of the de-activated carbon at the bottom of the unit. There are door latches 609, that secure and seal the doors to prevent any exhaust gas leakage. The eighth section 610 is where a fan can be housed and maintained with a motorized discharge damper 611 installed at the end of the unit. The discharge damper is comprised of opposed steel blades, constructed, e.g., of 14 gauge sheet metal. In accordance with one or more embodiments, the bearings are sealed for life lubrication and the damper linkage and shafts are zinc plated steel.

Turning to FIG. 6B, a side view of a modular system for multi-pollutant abatement in accordance with one or more embodiments of the invention. From the side view there is a collar 612 at the top of the unit and a collar 613 at the bottom of the unit that are both welded and sealed to the granular activated carbon W-frame to allow access to the top and bottom of the granular activated carbon for loading and unloading of the granular activated carbon material. Also shown in the side view, double doors 614 and single doors 615 are included to allow access to the internal components of the unit, e.g., for the purpose of annual inspection of the internal lining and all of the unit's internal components.

FIG. 6C shows a unit from an end view in cross-section. In accordance with one or more embodiments, the external lining 616 is constructed of pre-galvanized sheet steel (e.g., 16 gauge (2.4 mm)) and is etched, epoxy coated and finished with durable enamel paint. In accordance with one or more embodiments, the internal media 617 in between the panels may be incombustible thermal acoustic, shot free glass fiber insulation with long resilient fibers bonded with thermosetting resin. In addition, the internal media 617 may be a bacteria and fungus resistant material that will not crumble or break and will conform to irregular surfaces and return to full thickness if compressed. In accordance with one or more embodiments, the internal media 617 has the required fiber properties as rated by underwriter's laboratories and, e.g., meets UL standards MVSS-302 and UL94HF-1. The internal skin 618 is constructed of ICONEL alloy, e.g., 12 (6.4 mm) gauge, and welded water tight to withstand high temperatures and a moist acid environment. In addition, the internal lining may be constructed with, but not limited to, an ICONEL alloy that is high nickel, high chromium for resistance to oxidizing and reducing environments. In some cases HASTELLOY alloy maybe chosen over the ICNONEL alloy for resistance to a wide range of organic acids and the resistance to chloride-induced SCC, and other reducing chemicals.

The structural frame 619 is constructed from, but not limited to, 6"×6"×0.187 high strength stainless steel (HSS) with all cut edges located within the unit having high quality welded joints and/or bolt fittings 622. At the bottom of the unit there is a continuous, sloping floor 620 so all condensed liquid droplets from the condensing media are directed to a floor drain 621 located and the lowest point of the floor. In accordance with one or more embodiments, the sloped floor is also constructed of ICONEL alloy, e.g., 12 (6.4 mm) gauge, and welded water tight to withstand a strong liquid acid concentration.

FIG. 6D shows an example of access doors in accordance with one or more embodiments of the invention. The access doors 623 of the unit will vary in size and are mounted on a steel frame (not shown) with multiple chrome door hinges 624, a cam-type door latch 626, and an inspection window 625. The access door 623 has a single rubber gasket seal 627 to withstand abnormal high temperature conditions, e.g., 240-350C. The door inspection window 629 is double glazed with wire 628 reinforced glass mounted in a channel and sealed. The internal skin 630 of the access door is constructed with inconel alloy and welded water tight. With the insulation or media 631 in between the door is incombustible thermal acoustic, shot free glass fiber insulation with long resilient fibers bonded with thermosetting resin.

Figure 7A:
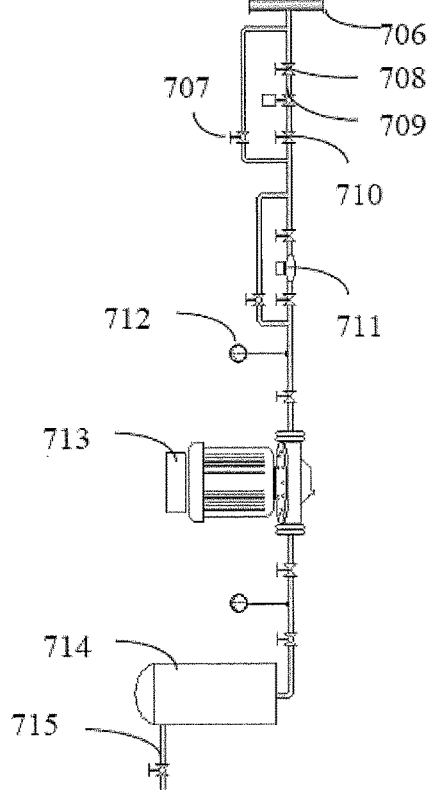
FIGS. 7A-7D show a high pressure fogging array system in accordance with one or more embodiments of the invention.
Figure 7B:
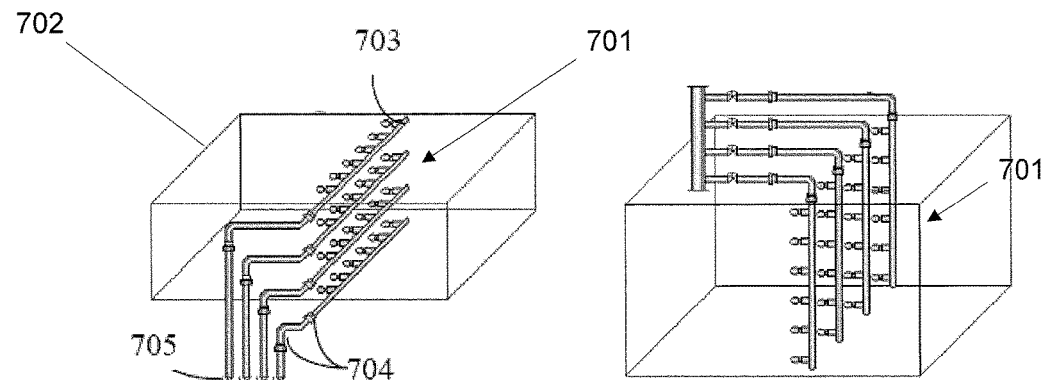

FIGS. 7A-7D illustrate a high pressure fogging array 701 in accordance with one or more embodiments of the invention. For example, the high pressure fogging array 701 may be employed as the first, second, and/or third fogging arrays in a multi-pollution abatement device, as described above reference to FIG. 5. The high pressure fogging array 701 can be side loaded into a module 702 of a multi-pollution abatement unit, as shown in FIG. 7A, where each individual rod includes multiple high pressure fogging nozzles 703. Advantageously, when replacement of the high pressure fogging array 701 is desired, the high pressure fogging array 701 may be drawn or pulled from the side of the multi-pollution abatement unit without needing to shut down the unit. As shown in FIG. 7B, the high pressure fogging array 701 can also be configured so that each fogging rod can be top loaded. Furthermore, in accordance with one or more embodiments, each individual rod can be drawn or pulled out from the top or side of the unit for replacement of the high pressure nozzles without shutting down the unit. In such an arrangement, each rod has quick connect and disconnect fittings 704 to allow each individual rod to be disconnected and pulled out from the multi-pollution abatement unit so each high pressure fogging nozzle can be inspected and replaced when needed without interfering with the operation of the multi-pollution abatement unit or boiler system.

FIG. 7A also shows an example of a water supply system that may be used in conjunction with a high pressure fogging array in accordance with one or more embodiments of the invention. In FIG. 7, RO water, or in some cases, city water is directed through piping valves and fitting 715 and enters an inline water filter bag filter 714 where solids, oil, and hydrocarbons are removed from the water to prevent plugging of the high pressure nozzles. The filtered water is directed through a high pressure pump 713 where the water is increased in pressure from normal city water pressure (about 60 psi) up to about 3000 psi. The high pressure pump 713 is equipped with a variable speed drive to increase and decrease the water pressure as required for modulation of the exhaust gases. The high pressure water or solution is directed through visible pressure gauges 712, one located on the suction side of the high pressure pump 713 and the other located on the discharge side of the high pressure pump 713. These gauges are used by the operator to ensure that the pump is operating in a normal fashion. The high pressure water or solution is then directed through a flow meter 711 where the quantity of high pressure water or solution is monitored as it is being delivered to the high pressure fogging nozzles 703. The high pressure water or solution is then directed through a control valve 709 that controls the quantity of the high pressure water or solution that flows to the high pressure fogging nozzles. There is a shut off valve 710 before the control valve 709 and a shut off valve 708 after the control valve 709 as well as a globe valve 707 to by-pass the control valve 709 if the control valve 709 needs repair or replacement. The high pressure water or solution is then directed to a common header 706 where the high pressure water is collected and distributed to the individual high pressure fogging rods and nozzles through a series of valves piping and fittings 705.

Figure 7C:
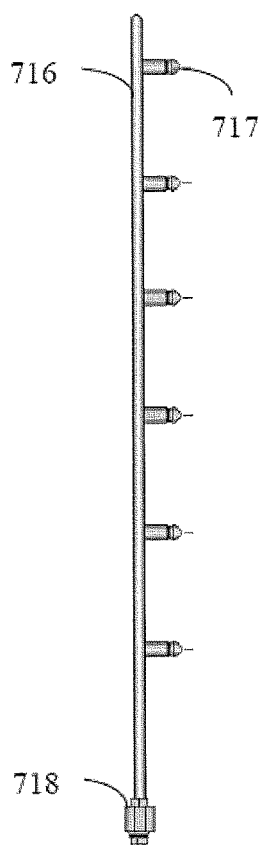

Furthermore, in one or more embodiments, the high pressure fogging rod 716 is a seamless tube constructed of 316L stainless steel, Inconel alloy, or Hastelloy alloy for resistance to a wide range of organic acids and other reducing chemicals and for resistance to chloride-induced stress corrosion cracking As shown in FIG. 7B-7C, along the high pressure fogging rod 716 are multiple high pressure fogging nozzles 717 engineered and installed to be a specific distance from one another, e.g., 3 feet and at a downward angle from the exhaust flow, e.g., 2 degrees to prevent plugging of orifices and to ensure that the fog ball or cloud is propelled against the exhaust gas flow thereby covering the full surface area of the exhaust gas flow. The high pressure fogging rod 716 also has a quick disconnect 718 on one end while the other end is capped and welded. Furthermore in one example, a quick disconnect 718 is a double union compression fitting where the compression fitting joins two tubes together. One of ordinary skill will appreciate that may different types of suitable connection fittings are known and may be employed without departing from the scope of the present disclosure.

Figure 7D:

FIG. 7D shows a high pressure nozzle 719 in accordance with one or more embodiments. High pressure nozzle 719 is designed with multiple orifices. Each orifice is manufactured so as to deliver a small water or liquid droplet about 10 microns in diameter. The high pressure fogging nozzle 719 has a standard pipe thread at one end so as to be screwed into a coupling 720 that is welded into the high pressure fogging rod 716.

Figure 8:
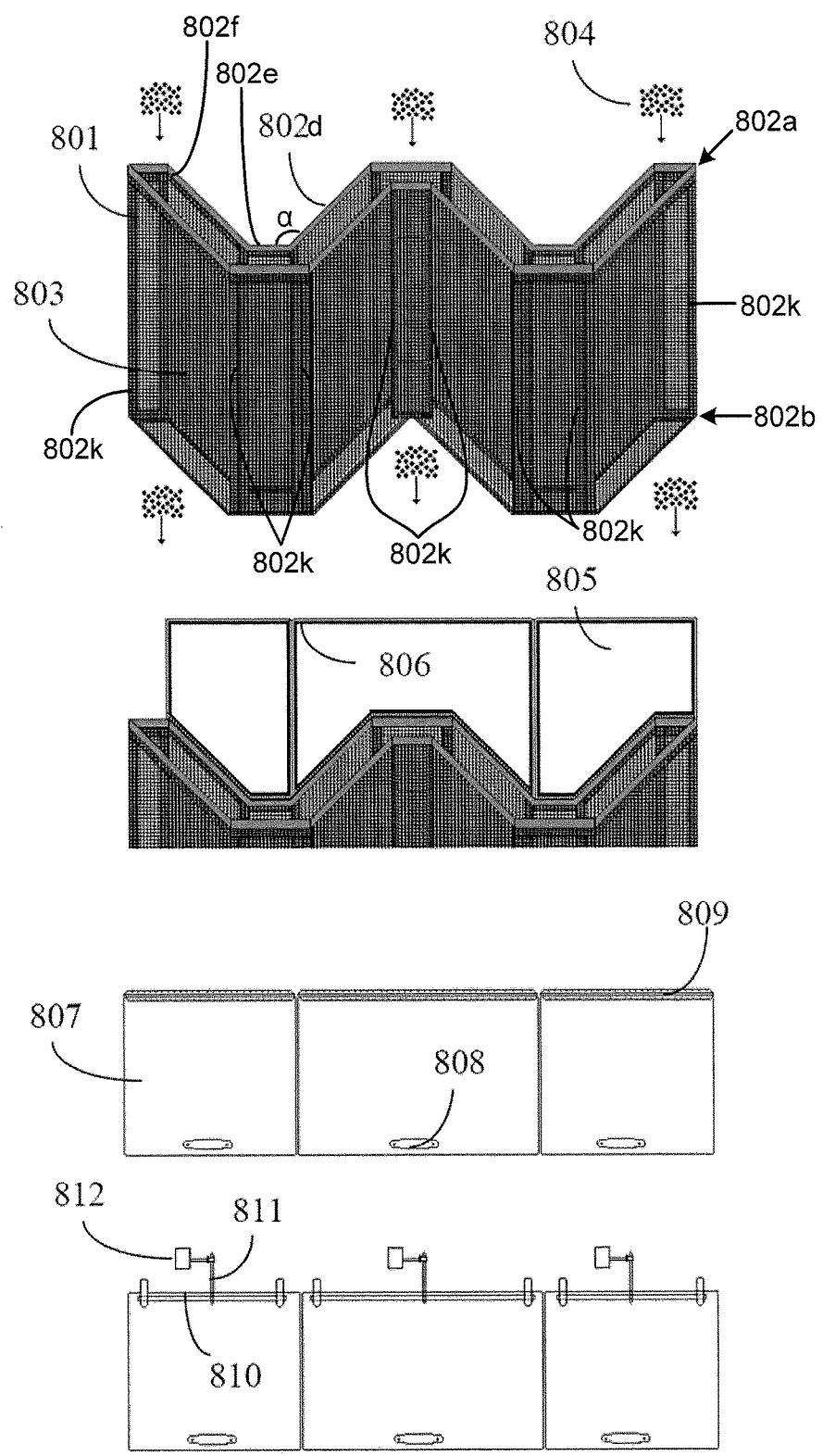
FIG. 8 shows an activated carbon frame section in accordance with one or more embodiments of the invention.

FIG. 8 illustrates an activated carbon stage, e.g., a granular activated carbon frame ("the frame") in accordance with one or more embodiments. In accordance with one or more embodiments, the cross-section of the frame may generally take the form of a W, although other embodiments may take other shapes without departing from the scope of the present disclosure. As shown in FIG. 8, a W-frame has a cross-sectional structure that is generally "W-shaped." More specifically, the cross-sectional shape of the frame may include a series of bends in alternating directions along the length of the frame. In the embodiment shown in FIG. 8, the cross section includes three bends, thereby forming the generally W-shaped cross-section. In accordance with one or more embodiments, any number of bends may be used to generate the cross-sectional shape, e.g., one bend would form a V-shape, while more than three bends would generally form a zig-zag or saw tooth shape.

As shown in FIG. 8, the frame itself is formed from two collars, a top color 802a and a bottom collar 802b. Each collar includes at least two members 802d and 802e that form a single member having an opening angle α that is obtuse, or greater than 90 degrees. This obtuse member in combination with a third member 802f makes a generally V-shaped member. Finally, this portion of the frame may be of a general form having any number of V-shaped sub-members that, taken together make up one side of a collar 802a or 802b. The precise value of α depends on the number of bends present, and the length and width of the frame itself and, thus, will vary depending on the physical constraints of the particular installation. The frame itself is made up of a top collar 802a and a bottom collar 802b connected by several intervening vertical members 802k. In accordance with one or more embodiments, e.g., the top collar 802a and bottom collar 802b may be welded to a series of vertical connecting members. Furthermore, the frame's top and bottom may be rigidly attached, e.g., welded, to the multi-pollution abatement unit to limit the vibration or movement of the frame within the unit. In addition, a nickel wire mesh or screen 803 is welded to the frame to form a holding or containment field, while at the same time allowing exhaust gases to pass through the frame with very little pressure loss or resistance.

In accordance with one or more embodiments, the frame of the activated carbon stage may be constructed from 316L stainless or inconel alloy channel steel, where the channel is made in the shape of a W, as shown in FIG. 8. However, the frame is not limited to only 316L stainless or inconel alloy channel steel materials. In accordance with one or more embodiments, frame surface is covered with an acid resistant coating to ensure minimum erosion and corrosion. One of ordinary skill will appreciate that nickel wire mesh is also named nickel wire netting, nickel screen, and nickel cloth, and as such, these also may be used without departing from the scope of the present disclosure.

The wire mesh 803 may be made by advanced vacuum melting process, by forging, rolling, annealing, drawing and weaving. Examples of weaving methods include twilled weaving and plain weaving. In accordance with one or more embodiments, nickel wire mesh is used for its advantageous heat and corrosion resistance properties. Furthermore, nickel wire mesh is readily available in many mesh and wire gauge sizes thereby allowing multiple choices of granular activated carbon particle sizes. As described above in reference to FIG. 7, the granular activated carbon 804 is loaded from the top of the multi-pollution abatement unit and the de-activated carbon is unloaded from the bottom of the multi-pollution abatement unit.

In accordance with one or more embodiments, materials containing high fixed carbon content may be activated and used as a source of granulated activated carbon. For example, coal, coconut shell, wood, peat and petroleum residues may be used. Most carbonaceous materials do have a certain degree of porosity and an internal surface area in the range of 10-15 $m^2/g$. During activation, the internal surface becomes more highly developed and extended by controlled oxidation of carbon atoms. After activation, the carbon will have acquired surface area between 700 and 1500 $m^2/g$. Granular activated carbon is a very non-selective sorbent and has a great affinity for a wide spectrum of organic compounds. Pore diameters of activated carbon may be categorized as follows:

micropores<40 Angstroms mesopores 40-5,000 Angstroms macropores>5,000 Angstroms (typically 5,000-20,000 Angstrom)

For example, in accordance with one or more embodiments, granular activated carbon from coconut shell having macro-pores may be used within the activated carbon stage. However, granular activated carbon having micropores, mesopores, and/or macropores may be used without departing from the scope of the present disclosure. Generally speaking smaller pore diameters results in activated carbon granules that have a higher surface area and, thus, in certain circumstances may work as a more effective sorbent. In addition, the physical size, or mesh size, of a granular activated carbon must be considered in relation to the exhaust gas flow rate in the system. The smaller the granular activated carbon mesh size the greater the resistance to exhaust gas flow. Thus, in accordance with one or more embodiments, the smallest mesh size carbon that will satisfy the pressure drop limitations of the system is selected.

Returning to FIG. 8, in accordance with one or more embodiments, at the top and bottom of the multi-pollution abatement unit activated carbon stage are doors 805 and 807. These doors allow access to the interior of the frame so that granular activated carbon may be replaced, when necessary. Furthermore, the doors 805 and 807 may be closed and sealed with a rubber gasket 806 to prevent any exhaust gas leak during operation of the unit. The multi-pollution abatement unit carbon frame section doors 805 and 807 are installed with handles, locking hatch 808 and hinges 809 for easy opening of the doors and to ensure safe operation of the unit. Furthermore the doors 805 and 807 can be installed with connecting rod 810 having a universal linkage kit 811 and electric motor 812 so as to automatically open the doors 805 and 807 when needed.

Figure 9:
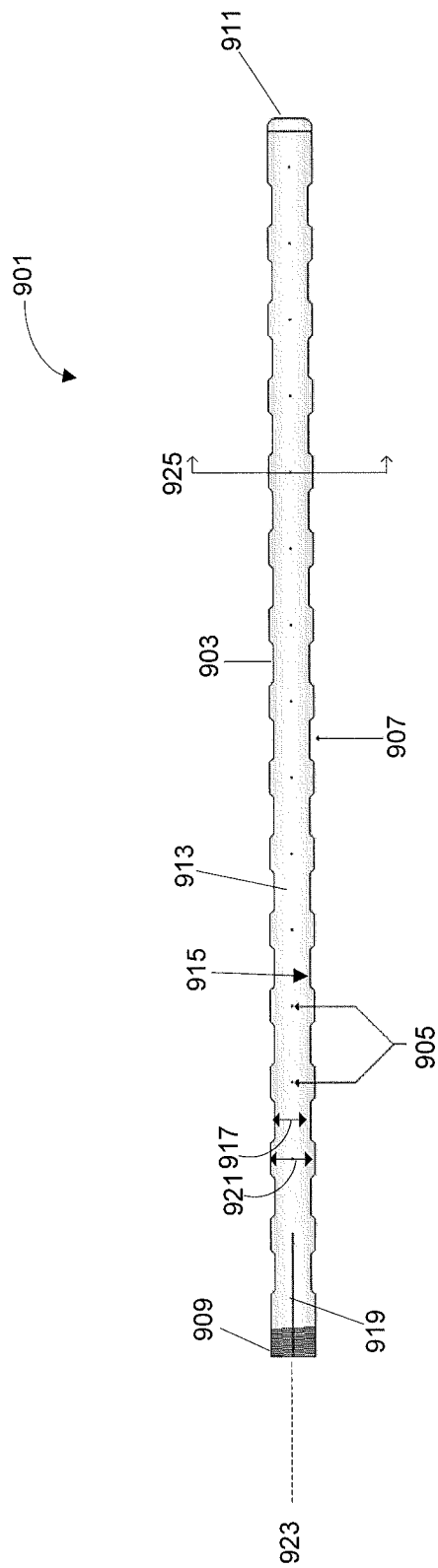
FIG. 9 shows an example of a high-pressure fogging rod in accordance with one or more embodiments of the invention.

FIG. 9 shows an example of a high-pressure fogging rod in accordance with one or more embodiments of the invention. The high-pressure fogging rod 901 is formed from a hollow metal rod 903. In accordance with one or more embodiments, the hollow metal rod may be formed of a solid-solution nickel-based alloy, e.g., 686 alloy tubing. Hollow metal rod 903 includes multiple orifices 905. In accordance with one or more embodiments of the invention, the multiple orifices 905 pass through the wall 907 of the hollow metal rod 903. At one end 909 of the hollow metal rod 903 is an NPT threaded connection to allow for connecting the hollow metal rod 903 to a tubing manifold (not shown) as described in more detail below. Also located at the end 909 is an angle indicator line 919 that runs co-linear with a line drawn through all of the orifices. At the other end of the hollow metal rod 903 is a welded cap 911. In accordance with one or more embodiments of the invention, the internal surface 915 of the wall 907 is formed so that the internal diameter of the internal volume 913 of the hollow metal rod 903 varies along the length of the hollow metal rod 903. For example, in accordance with one or more embodiments of the invention, the internal diameter 917 between two orifices is smaller than the internal diameter 921 that is located at an axial position that includes an orifice along an axial direction 923 of the tube. In accordance with one or more embodiments of the invention, employing a hollow metal rod 903 that is fabricated to have a decrease in diameter after an orifice followed by an increased diameter before the next orifice hole creates a flow through nozzle or Venturi effect, as described above.

FIGS. 10A-10C show cross-sectional views through the high-pressure fogging rod taken through a line that passes through plurality of orifices 905 (e.g., line 925 in FIG. 9). In accordance with one or more embodiments of the invention, a fine mist or fog 1001 is created by forcing fluid at high-pressure through the orifices 905. In accordance with one or more embodiments, the orifices may be of circular cross-sectional shape and may have diameters on the order of 0.008 in. With orifices of this size, a 3,000 psi fluid forced therethrough may form a fog ball having individual droplet sizes in the range of 5 to 10 microns. Furthermore, the fluid drop velocity exiting the orifice is near or at the speed of sound (Mach 1). In accordance with one or more embodiments of the invention, the angle indicator 919 shown in FIG. 9 may be used to orient the line of orifices in a known direction. For example, FIG. 10A shows an orientation of the high-pressure fogging rod that results in a fog ball being created in a direction substantially horizontal with respect to the exhaust gas flow direction 1007. FIG. 10B shows an orientation of the high-pressure fogging rod that results in a fog ball being created in a downwardly direction with respect to the exhaust gas flow direction 1007, i.e., at an angle $\theta$ with respect to the gas flow. Thus, in accordance with one or more embodiments of the invention, the high-pressure fogging rod may be positioned in any desired orientation. In accordance with one or more embodiments of the invention, an optional pinion 1003 may be positioned directly in front of orifices 905 to disrupt the spherical spray pattern of the orifice, with pinion 1003 and fixedly attached to the high-pressure fogging rod 901 shown in FIG. 10C as a side view. Thus, the positioning of the pinion 1003 across a diameter of the orifice results in a fog ball that is asymmetric, elongated, or oval shaped rather than one having a substantially circular cross-section.

In accordance with one or more embodiments of the invention, the orifices 905 may be placed along the length of the high-pressure fogging device to ensure sufficient overlap of the fog balls, thus, ensuring full coverage across the exhaust stream. One of ordinary skill will also appreciate that the high-pressure fogging rod in accordance with one or more embodiments of the invention may employ various sizes for the orifices without departing from the scope of the present disclosure. One of ordinary skill will appreciate that a larger orifice will produce a fog ball comprised of large droplets. One of ordinary skill will appreciate that a smaller orifice will produce a fog ball comprised of small droplets.

Figure 11:
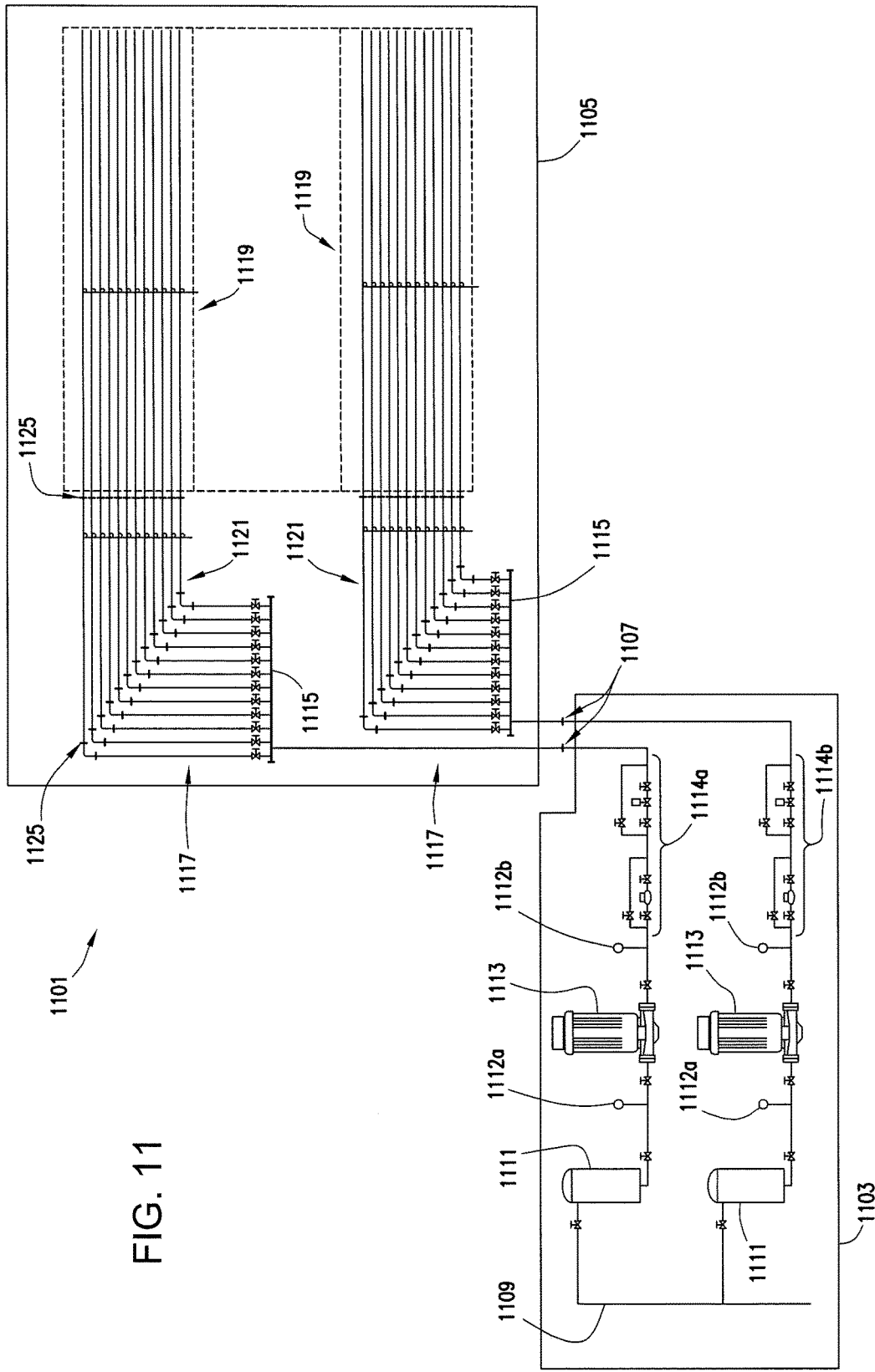
FIG. 11 shows a high-pressure fogging rod circuit in accordance with one or more embodiments of the invention.

FIG. 11 shows a high-pressure fogging rod circuit in accordance with one or more embodiments of the invention. The high-pressure fogging rod circuit 1101 includes high-pressure pumping stage 1103 and high-pressure fogging rod assembly 1105. High-pressure pumping stage 1103 and high-pressure fogging rod assembly 1105 may be connected by way of connectors 1107. The high-pressure fogging rod circuit 1101 begins with a fluid feed from relatively large tubing 1109. In accordance with one or more embodiments of the invention, the fluid feed tubing may be 1 inch diameter stainless steel (SS) made from 316L steel. The fluid is then routed through filters 1111 and into high-pressure pumps 1113. After the high-pressure pumps 1113 are various pressure gauges 1112a-1112b, valves and flow meters 1114a-1114b, as shown. The pressurized fluid then enters one or more tubing manifolds 1115. As shown in FIG. 11, in accordance with one or more embodiments of the invention, the tubing manifolds may be formed from 1 inch 316L SS tube and may provide pressurized fluid to a plurality of feed tubes 1117, that, in turn, provide the pressurized fluid to the array of high-pressure fogging rods 1119. Interposed between the array of high-pressure fogging rods 1119 and feed tubes 1117 are intermediate tubes 1121. In accordance with one or more embodiments of the invention, the intermediate tubes may be formed from ¾ inch SS 316L tubing and the high-pressure fogging rods 1119 may be formed of ½ inch 686 alloy tubing. However, one of ordinary skill will appreciate that other tube sizes and tube materials may be employed in any given system, depending on the type of fluid used and the amount of fluid volume desired. Accordingly, FIG. 11 is intended as one example of a high-pressure fogging rod circuit in accordance with one or more embodiments of the invention and, thus, the attached claims are not limited to only that shown in FIG. 11.

In accordance with one or more embodiments of the invention both fogging rods 1119 and intermediate tubes 1121 are connected by way of quick disconnect fittings 1125. Accordingly, the removal of individual fogging rods for service is made easier and more time efficient. In particular, the design of the high-pressure fogging rod circuit shown in FIG. 11 allows for the removal of single fogging rods without the hassle of removing the whole fogging rod assembly.

As shown in FIG. 11, the high-pressure fogging rod circuit 1101 may be employed within an HRPA device wherein the array of high-pressure fogging rods 1119 may form the first and second misting stages on either side of a condensing medium stage 1123. Accordingly, as described above in reference to FIG. 5, the high-pressure fluid may include any composition of any number different fluids, e.g., $H_2O$ or $H_2O_2$.

Figure 12A:
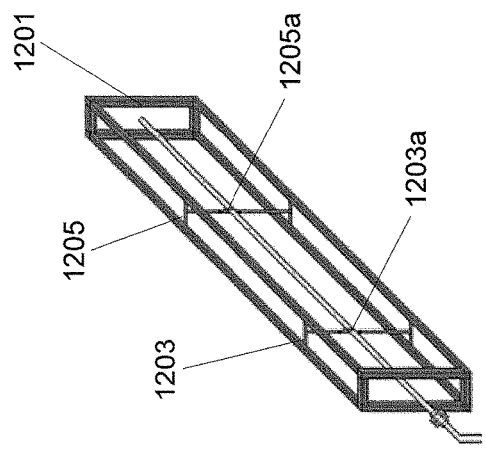
FIGS. 12A-12B show a high-pressure fogging rod support tray in accordance with one or more embodiments of the invention.
Figure 12B:
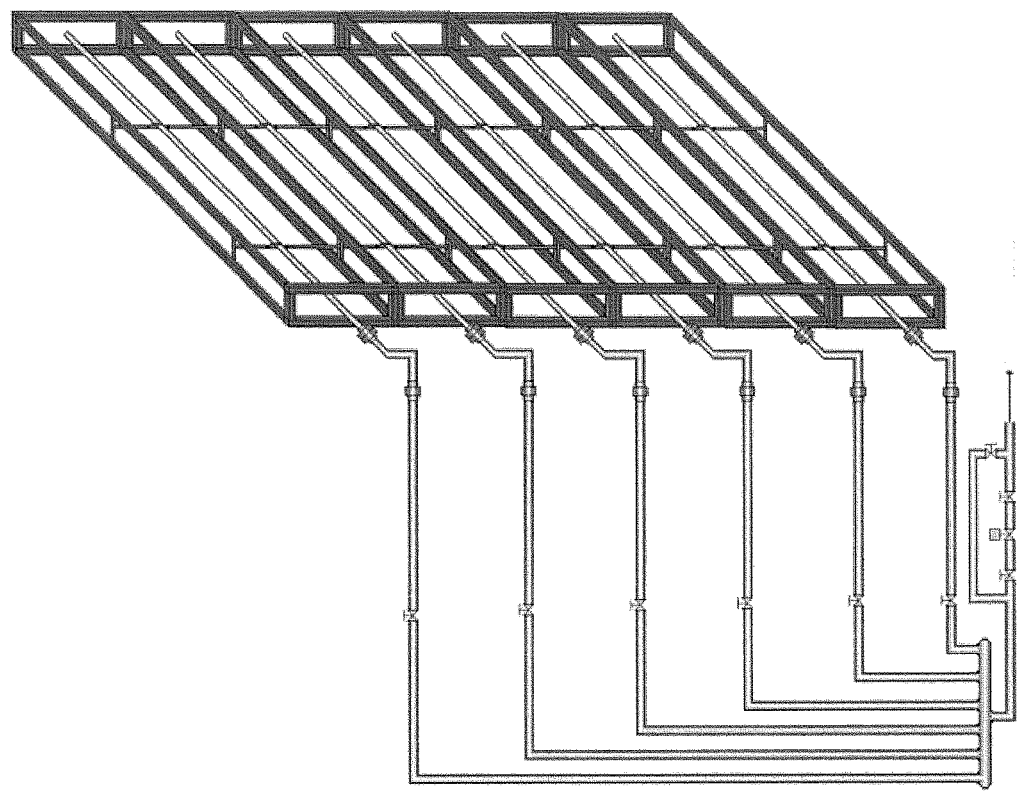

FIG. 12A shows a high-pressure fogging rod support tray in accordance with one or more embodiments of the invention. More specifically, the high-pressure fogging rod support tray 1201 may include a support frame that further includes two or more support members 1203, 1205 for supporting a high-pressure fogging rod 203. More specifically, the high-pressure fogging rod may be threaded through supported brackets 1203*a* and 1205 in order to support the high-pressure fogging rod within the support tray 1201. Accordingly, an array of high-pressure fogging rods may be arranged as a high-pressure fogging rods assembly by stacking any number of support trays 1201, as shown in FIG. 12B. Accordingly, the support trays 1201 may be integrated within the HRPA device and with the individual high-pressure fogging rods 203 being configured to be individually removable from a corresponding support tray. In accordance with one or more embodiments of the invention, the support tray 1201 and high-pressure fogging rod 903 may be an integrated unit that may be removable as a unit from the HRPA device. While shown in a substantially horizontal mounting arrangement, in accordance with one or more embodiments of the invention, the high-pressure fogging rods may be mounted in a vertical direction. In accordance with one or more embodiments of the invention one or more arrays of fogging rods may be mounted in any direction that is substantially perpendicular to the gas flow direction without departing from the scope of the present invention.

In accordance with one or more embodiments, the high-pressure fogging rods are used to spray a high-pressure liquid against the exhaust flow to create the hydrolysis needed to convert the pollutants such as $NO_x$, $SO_x$, HCl, particulate, mercury, and $CO_2$. The high-pressure fogging rod in accordance with one or more embodiments of the invention eliminates all mechanical joints within the HRPA device ensuring that there will be no equipment down time because of failed fogging devices due to mechanical joints that were exposed to the acid environment inside the HRPA device.

The high-pressure fogging rods will be placed in the HRPA device unit to cover the surface area of the exhaust flow to ensure full coverage of the polluted exhaust stream comes in contact with the high-pressure water droplets.

Figure 13C:
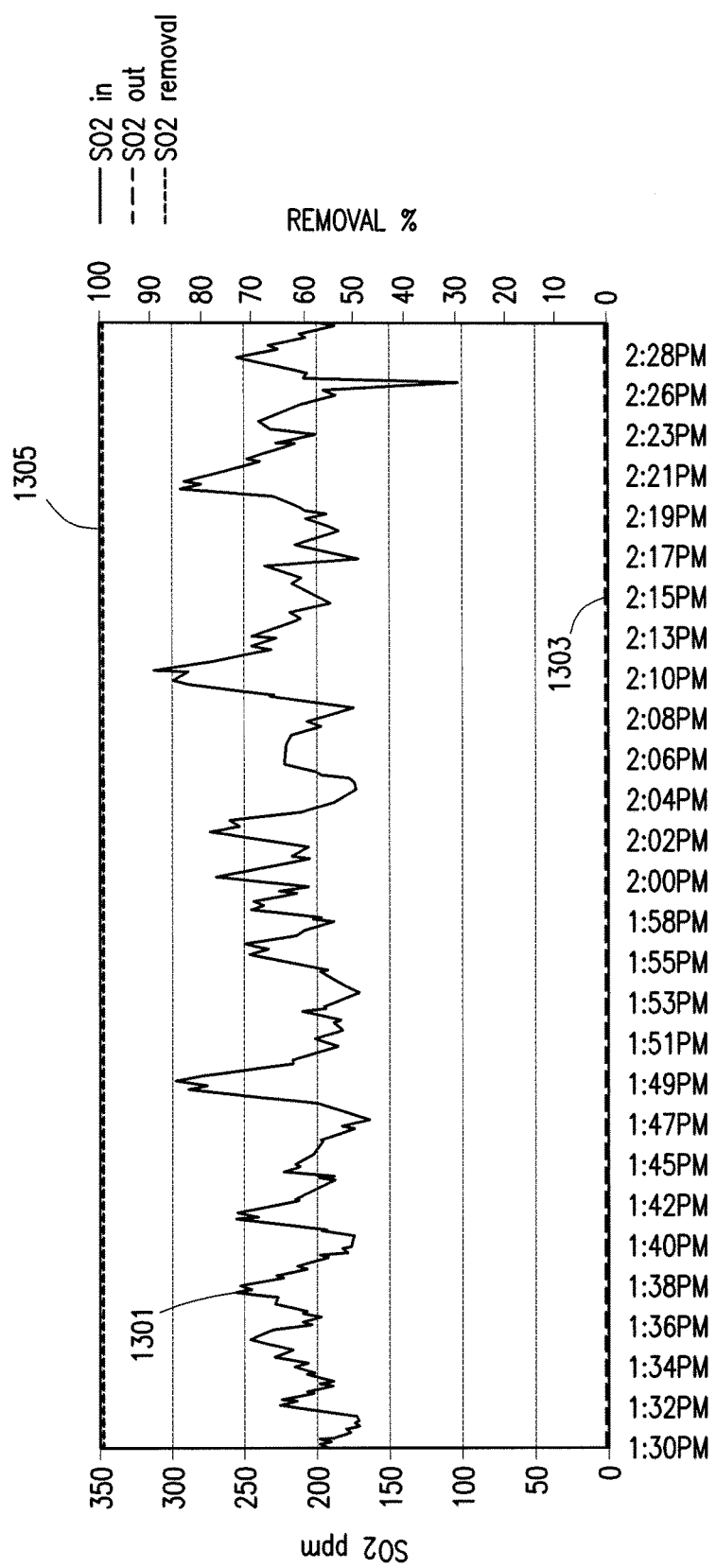
Figure 13D:
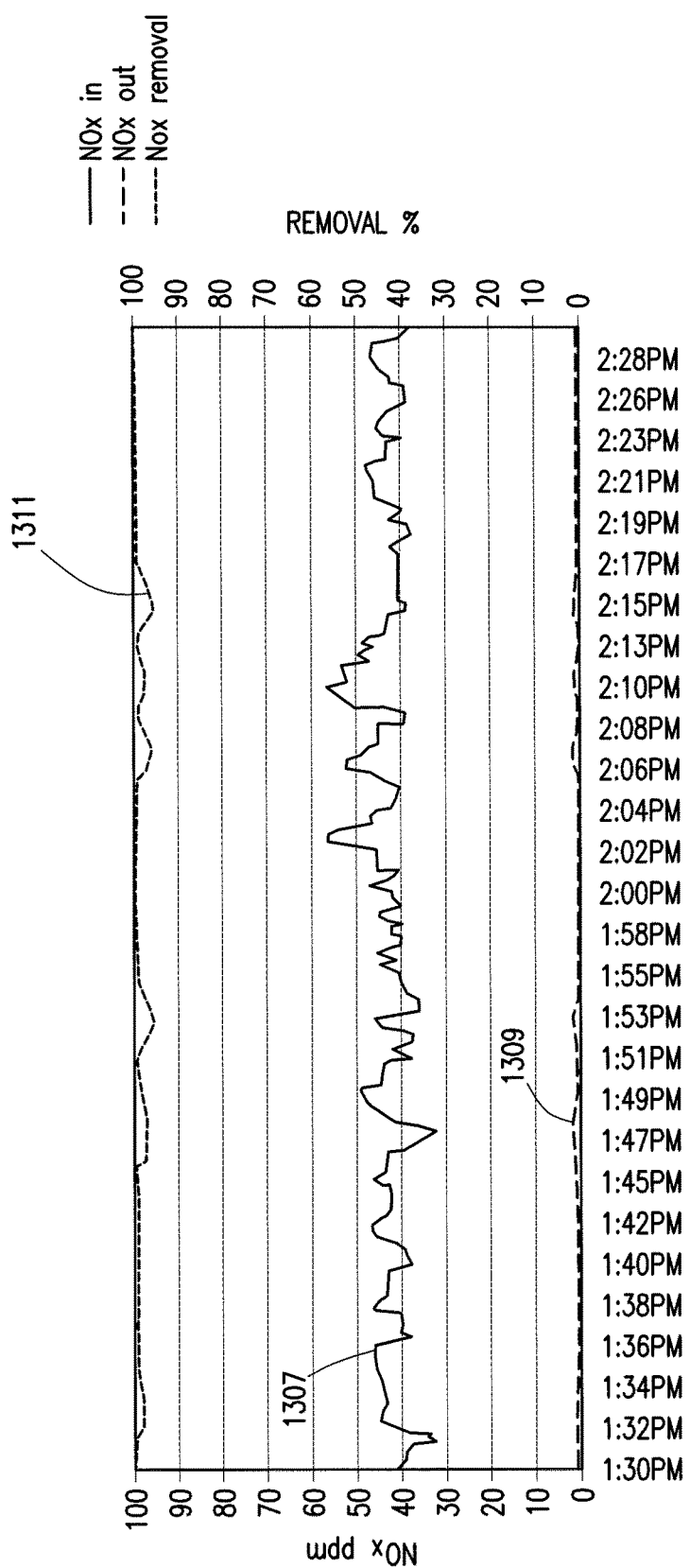

FIGS. 13A-D show examples of test data that illustrates the multi-pollution abatement capability of the system in accordance with one or more embodiments. The system used to acquire the data shown in FIG. 13 was a system, similar to that shown in FIG. 5, but employing two fogging stages, rather than three, as shown in FIG. 5, and an activated carbon frame section of the W-frame type, shown and described in reference to FIGS. 5 and 8. The first fogging stage employed an $H_2O+H_2O_2$ mixture and the second fogging stage employed a water only fogging stage, as described above in reference to FIG. 5. The system was deployed on the output of a fossil fuel fired boiler burning eastern bituminous coal having the composition shown in FIG. 13A: 69.9% carbon, 6.4% oxygen, 2.2% sulfur, 2.4% moisture, 4.7% hydrogen, 1.2% nitrogen, 13.2% ash; and having a heating value of 12,644 Btu/lb. As shown in FIG. 13B, the exhaust gas entering the unit was at a temperature of 257 F (125 C) and the composition of the exhaust gas entering the multi-pollution abatement unit was 43.36 ppm $NO_x$, 216.58 ppm $SO_2$, and 13,865 ppm $CO_2$. After passing through the multi-pollution abatement unit (i.e., at the outlet of the unit) the exhaust gas was at a temperature of 89 F (32 C) and had a composition of 0.44 ppm $NO_x$, 0.00 ppm $SO_2$ and 3,352 ppm $CO_2$. FIG. 13C shows time series data for $SO_x$ removal from the exhaust gas using the above described multi-pollution abatement unit over roughly a one hour time period. Series 1301 shows the input level of $SO_2$ (ppm) and series 1303 and 1305 show the output $SO_2$ level (ppm) and $SO_2$ removal fraction (%), respectively. FIG. 13C shows that despite a fluctuating input $SO_2$ level the $SO_2$ was effectively removed (nearly 100% at all times over the one hour period) from the exhaust gas stream. Likewise, FIG. 13D shows time series data for $NO_x$ removal from the exhaust gas using the above described multi-pollution abatement unit over roughly a one hour time period. Series 1307 shows the input level of $NO_x$ (ppm) and series 1309 and 1311 show the output $NO_x$ level (ppm) and $NO_x$ removal fraction (%), respectively. FIG. 13D shows that despite a fluctuating input $NO_x$ level the $NO_x$ was effectively removed (greater than 95% at all times over the one hour period) from the exhaust gas stream. Furthermore, FIG. 13B illustrates that approximately 76% of the $CO_2$ was also removed from the exhaust gas stream.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A system for removing contaminants from an industrial stream of exhaust gas, the system comprising:
   a first misting stage configured to receive the stream of exhaust gas and contact the stream of exhaust gas with mist of water and hydrogen peroxide ($H_2O_2$) to create a first liquid comprising first liquid acids, the first liquid acids comprising nitric acid ($HNO_3$) and carbonic acid ($H_2CO_3$);
   a first condensing medium configured to condense the first liquid acids from the stream of exhaust gas comprising $HNO_3$ and $H_2CO_3$ and to collect on a surface of the first condensing medium a first residual liquid mixture of $HNO_3$ and $H_2CO_3$;
   a second misting stage configured to receive the stream of exhaust gas and contact the stream of exhaust gas with water mist to create a second liquid comprising second liquid acids, the second liquid acids comprising nitric acid ($HNO_3$) and carbonic acid ($H_2CO_3$);
   a second condensing medium configured to condense the second liquid acids from the stream of exhaust gas comprising $HNO_3$ and $H_2CO_3$ and to collect on a surface of the second condensing medium a second residual liquid mixture of $HNO_3$ and $H_2CO_3$;
   a third misting stage configured to receive the stream of exhaust gas and contact the stream of exhaust gas with a mixture of chilled water and amine ($RNH_2$) to form a liquid solution of carbon dioxide ($CO_2$);
   a third condensing medium configured to condense the liquid solution of $CO_2$ and to collect on a surface of the third condensing medium a third residual liquid mixture of $HNO_3$, $H_2CO_3$, and $CO_2$; and
   an activated carbon stage configured to receive the stream of exhaust gas and to contact the stream of exhaust gas with granular activated carbon to further remove trace contaminants from the exhaust gas stream.

2. The system of claim 1, wherein the exhaust gas is created by combustion of coal.

3. The system of claim 1, wherein the exhaust gas is created by combustion of natural gas.

4. The system of claim 2, further comprising and located upstream from the first misting stage:
   a boiler configured to receive the exhaust gas and to remove heat from the exhaust gas;

an electrostatic precipitator configured to receive the exhaust gas and remove particulate matter from the exhaust gas;

an ozone aspirator, wherein the ozone aspirator is configured to receive the stream of exhaust gas from the boiler and contact the stream of exhaust gas with ozone to convert nitrate (NO) within the exhaust gas to nitrogen dioxide ($NO_2$) thereby forming a stream of exhaust gas comprising $NO_2$ and residual NO; and an economizer configured to recover heat from the stream of exhaust gas.

5. The system of claim 1, wherein the activated carbon stage comprises:

granular activated carbon having an average size that is greater than 0.25 mm.

6. The system of claim 1 further comprising a fan configured to direct a clean exhaust gas stream out of the system.

7. The system of claim 1 further comprising a wastewater facility configured to receive a water film comprising the first residual liquid mixture and the second residual liquid mixture.

8. The system of claim 1 further comprising an exhaust stack configured to receive at least one of the first, second, and third residual liquid mixtures.

9. The system of claim 1, wherein the first condensing medium comprises a coating of one selected from a group consisting of Teflon and critical polyvinal chloride (CPVC).

10. The system of claim 1, wherein the second condensing medium comprises a coating of one selected from a group consisting of Teflon and critical polyvinyl chloride (CPVC).

11. The system of claim 1, wherein the activated carbon stage comprises a hollow frame configured to receive and hold activated carbon, wherein the hollow frame comprises a plurality of V-shaped members.

12. The system of claim 11, wherein the hollow frame comprises a wire mesh attached to a front side and a back side of the hollow frame.

13. The system of claim 11, wherein the plurality of V-shaped members form a hollow frame having a W-shaped cross-section.

14. The system of claim 12, wherein the activated carbon stage comprises a top opening for loading activated carbon and a bottom opening for unloading de-activated carbon.

15. The system of claim 14, wherein the activated carbon stage comprises sealed access doors on the top opening of the activated carbon stage and sealed access doors on the bottom opening of the activated carbon stage.

* * * * *